United States Patent
Lee et al.

(10) Patent No.: US 9,900,422 B2
(45) Date of Patent: Feb. 20, 2018

(54) MOBILE TERMINAL AND METHOD OF CONTROLLING THEREFOR

(71) Applicant: LG ELECTRONICS INC., Seoul (KR)

(72) Inventors: Jaehwa Lee, Seoul (KR); Jinsung Yi, Seoul (KR); Seungsook Han, Seoul (KR); Jaeyoung Ji, Seoul (KR); Jungmin Park, Seoul (KR); Minsoo Park, Seoul (KR); Yunjueng Mhun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 237 days.

(21) Appl. No.: 14/510,604

(22) Filed: Oct. 9, 2014

(65) Prior Publication Data
US 2015/0106765 A1  Apr. 16, 2015

(30) Foreign Application Priority Data

Oct. 10, 2013 (KR) .................. 10-2013-0120471
Oct. 18, 2013 (KR) .................. 10-2013-0124756
Oct. 18, 2013 (KR) .................. 10-2013-0124757

(51) Int. Cl.
| | |
|---|---|
| *G06F 3/048* | (2013.01) |
| *H04M 1/725* | (2006.01) |
| *H04W 12/08* | (2009.01) |
| *G06F 3/0484* | (2013.01) |
| *G06F 3/0481* | (2013.01) |
| *G06F 3/0482* | (2013.01) |
| *G06F 3/0488* | (2013.01) |

(Continued)

(52) U.S. Cl.
CPC ...... *H04M 1/72563* (2013.01); *G06F 3/0482* (2013.01); *G06F 3/0484* (2013.01); *G06F 3/0487* (2013.01); *G06F 3/0488* (2013.01); *G06F 3/04817* (2013.01); *G06F 3/04842* (2013.01); *G06F 21/32* (2013.01); *G06K 9/001* (2013.01); *G06K 9/00013* (2013.01); *H04W 12/08* (2013.01); *G06K 2209/05* (2013.01)

(58) Field of Classification Search
CPC .......................... G06F 3/0487; G06F 3/0484
USPC ..................................................... 715/810
See application file for complete search history.

(56) References Cited

U.S. PATENT DOCUMENTS 7,688,314 B2 * 3/2010 Abdallah ............... G06F 21/32
                                                    345/156
9,733,752 B2 * 8/2017 Park ...................... G06F 3/0416
(Continued)

OTHER PUBLICATIONS

Hill, "How to Share Photos on Android (and Our Favorite Apps to Use)", 15 pages, http://www.digitaltrends.com/mobile/how-to-share-photos-on-android, retrieved from the Internet Apr. 22, 2015, XP055185246.

*Primary Examiner* — William Titcomb
(74) *Attorney, Agent, or Firm* — Birch, Stewart, Kolasch & Birch, LLP

(57) ABSTRACT

A mobile terminal including a wireless communication unit configured to provide wireless communication; a memory; a touch screen; and a controller configured to select a first function for executing the first function corresponding to a first fingerprint input, store the first function to correspond to the first fingerprint input in the memory, receive a fingerprint input via a fingerprint sensor, and execute the first function when the received fingerprint input corresponds to the first fingerprint input.

5 Claims, 38 Drawing Sheets

(51) Int. Cl.
  *G06K 9/00* (2006.01)
  *G06F 3/0487* (2013.01)
  *G06F 21/32* (2013.01)

(56) References Cited

U.S. PATENT DOCUMENTS

| | | | |
|---|---|---|---|
| 2007/0050304 A1* | 3/2007 | Smith | G06Q 20/3674 705/67 |
| 2007/0067224 A1* | 3/2007 | Smith | G06Q 30/0601 705/26.3 |
| 2007/0174206 A1* | 7/2007 | Colella | G06Q 20/382 705/64 |
| 2009/0102604 A1 | 4/2009 | Madhvanath et al. | |
| 2010/0231356 A1 | 9/2010 | Kim | |
| 2011/0070864 A1* | 3/2011 | Karam | G06F 21/34 455/411 |
| 2011/0086616 A1* | 4/2011 | Brand | G06Q 20/10 455/411 |
| 2011/0173539 A1* | 7/2011 | Rottler | G06F 3/0482 715/727 |
| 2011/0202466 A1* | 8/2011 | Carter | G06Q 20/20 705/67 |
| 2011/0287741 A1 | 11/2011 | Prabhu | |
| 2011/0307724 A1* | 12/2011 | Shaw | G06F 21/305 713/323 |
| 2012/0032782 A1* | 2/2012 | Colella | G06Q 20/385 340/5.83 |
| 2012/0293433 A1* | 11/2012 | Yamamoto | G06F 3/0412 345/173 |
| 2012/0310743 A1* | 12/2012 | Johri | G06Q 20/3278 705/14.58 |
| 2013/0129162 A1 | 5/2013 | Cheng et al. | |
| 2014/0258906 A1* | 9/2014 | Kim | G06F 21/84 715/771 |
| 2015/0095158 A1* | 4/2015 | Nasserbakht | G06Q 10/109 705/14.58 |

\* cited by examiner (a)   (b)

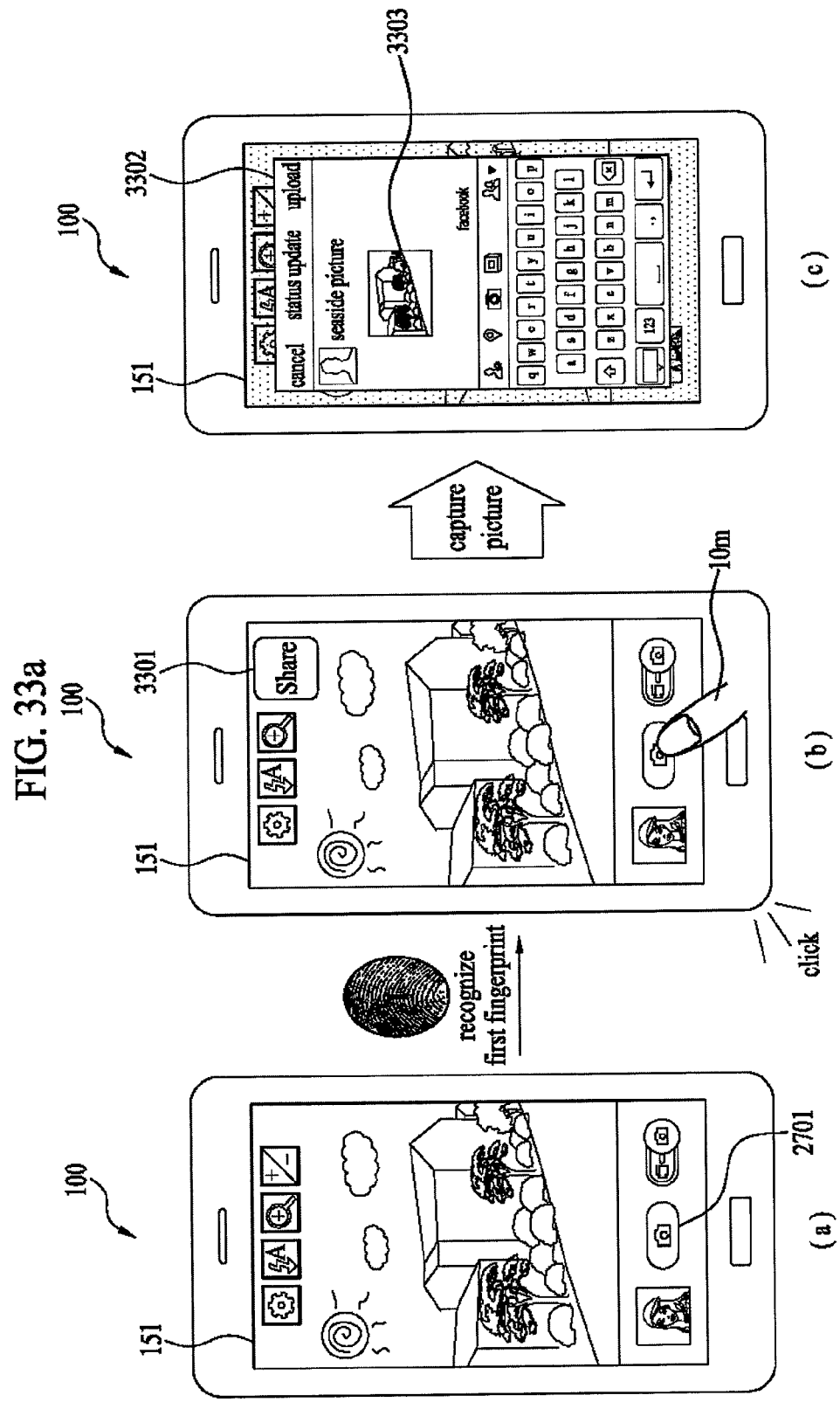

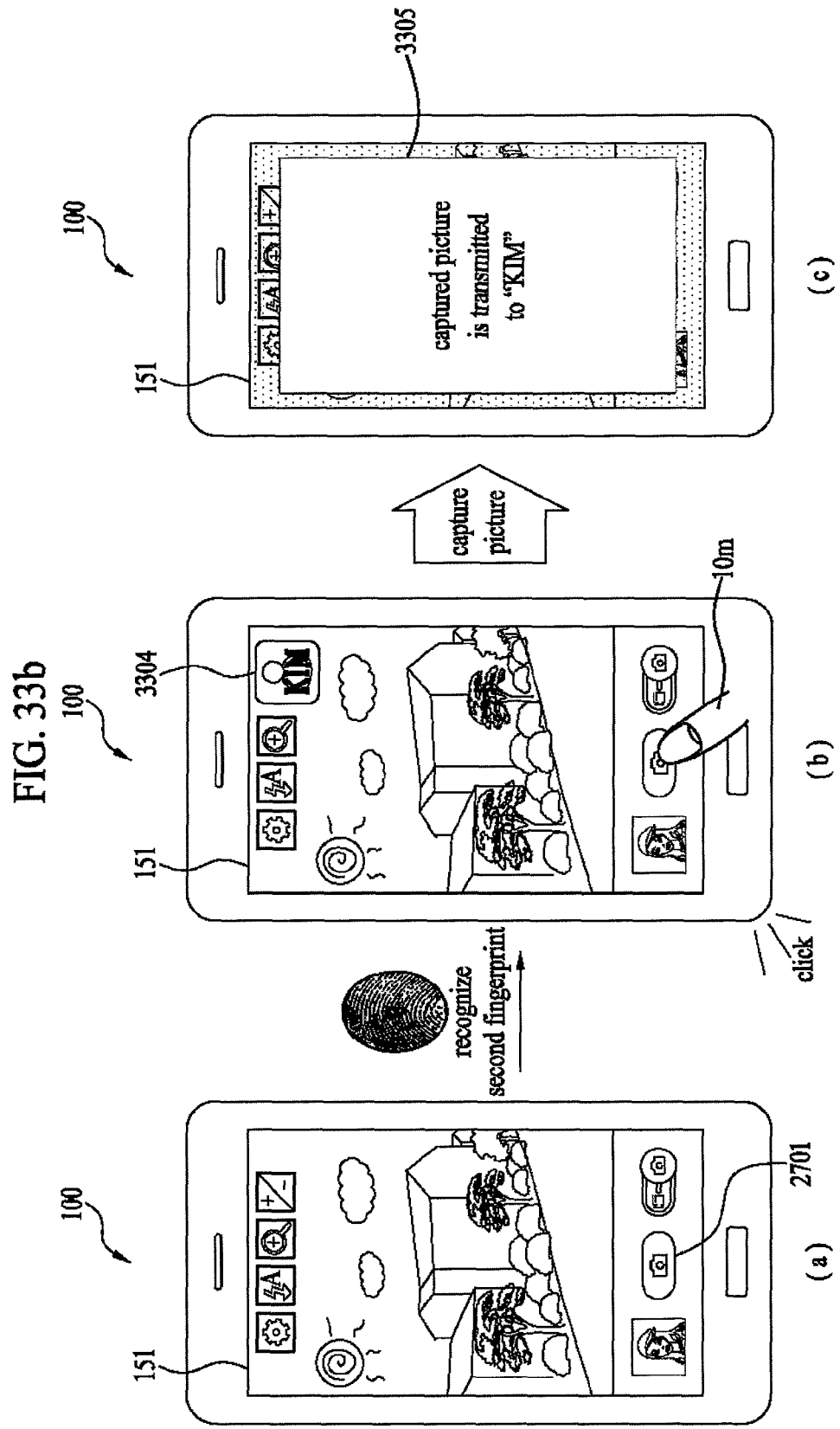

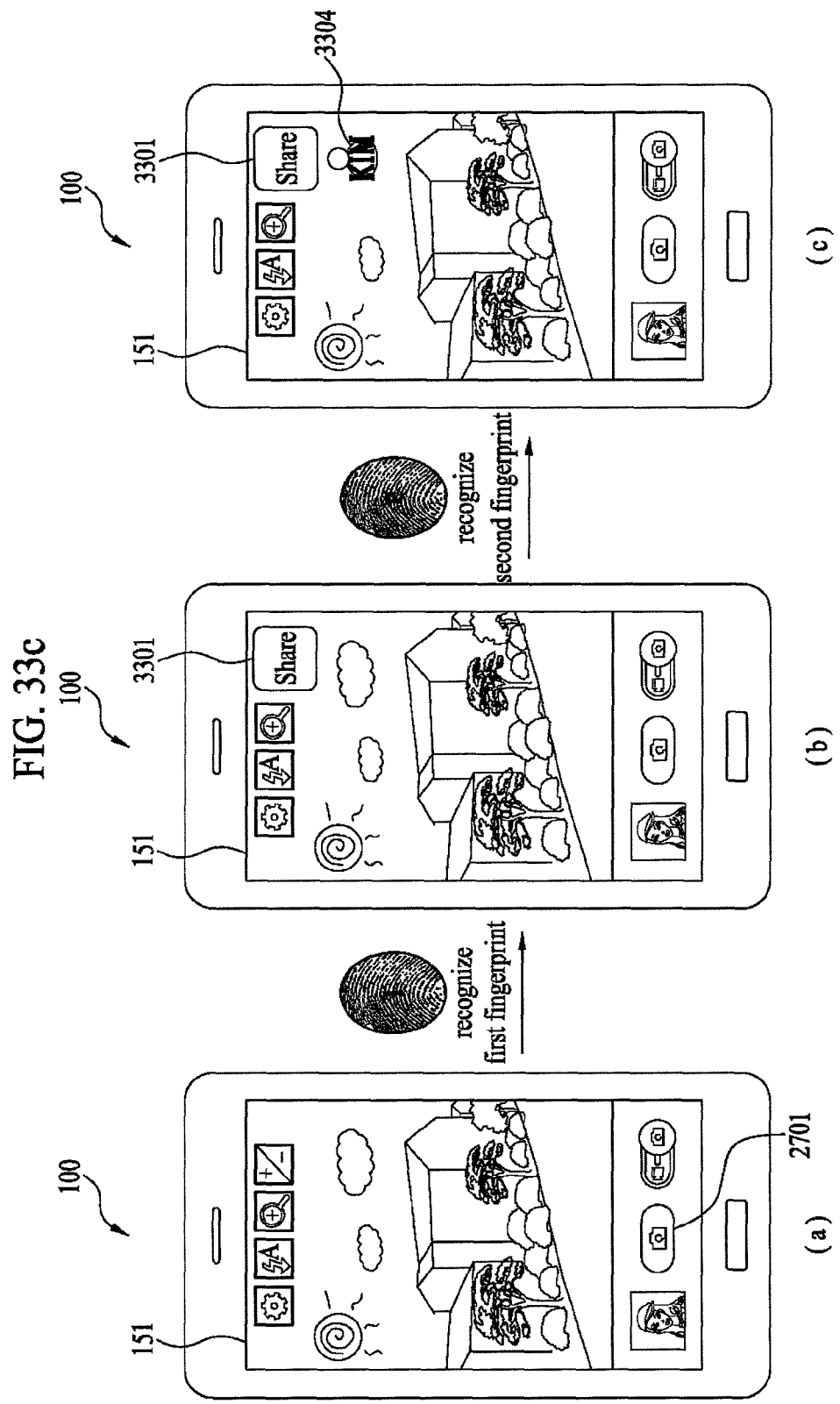

MOBILE TERMINAL AND METHOD OF CONTROLLING THEREFOR

Pursuant to 35 U.S.C. § 119(a), this application claims the benefit of earlier filing date and right of priority to Korean Patent Application No.: 10-2013-0120471 filed on Oct. 10, 2013, 10-2013-0124756 filed on Oct. 18, 2013, and 10-2013-0124757 filed on Oct. 18, 2013, the contents of which are hereby incorporated by reference herein in their entirety.

BACKGROUND OF THE INVENTION

Field of the Invention

The present invention relates to a mobile terminal enabling a user to more conveniently use the terminal and a method of controlling therefor.

Discussion of the Related Art

A mobile terminal can perform various functions such as data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals. In addition, the mobile terminals can be further classified into handheld terminals and vehicle mounted terminals. Recently, a fingerprint recognition sensor is introduced to a terminal to strengthen security. However, the functions provided by the fingerprint recognition sensor are limited and often inconvenient to the user.

SUMMARY OF THE INVENTION

Accordingly, one object of the present invention is to provide an apparatus and method thereof that substantially obviate one or more problems due to limitations and disadvantages of the related art.

Another object of the present invention is to provide a mobile terminal enabling a user command to be easily accessed/executed using a fingerprint sensor and a method of controlling therefor.

Yet another object of the present invention is to provide a mobile terminal enabling security to be set to prescribed content via fingerprint recognition and enabling the prescribed content to which security is set to be read and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal can include a memory configured to store one or more objects in response to each of one or more fingerprint inputs, a touch screen and if an input for selecting a first object related to a first function and a first fingerprint input are received, a controller configured to store the first object in response to the first fingerprint input and if the first fingerprint input is received, configured to control the touch screen to output the stored first object in response to the first fingerprint input.

In this instance, if an input for selecting a second object related to a second function and a second fingerprint input are received, the controller can control the memory to store the second object in response to the second fingerprint input. In addition, if the second fingerprint input is received, the controller can control the touch screen to output the stored second object in response to the second fingerprint input.

In this instance, the mobile terminal further includes a fingerprint recognition sensor configured to recognize a fingerprint, wherein the first fingerprint input is received via the fingerprint recognition sensor.

And, the controller is configured to control the touch screen to output an object list including a plurality of objects. In addition, if a third fingerprint input is received, the controller can arrange the object list based on a prescribed arrangement condition corresponding to the third fingerprint input. Further, if a fourth fingerprint input is received, the controller can control the touch screen to output all of the one or more objects in response to each of the one or more fingerprint inputs.

Also, if a plurality of objects are selected and the first fingerprint input is received, the controller can control the memory to store a plurality of the selected objects in response to the first fingerprint input. If a plurality of objects are stored in response to a first fingerprint and the first fingerprint input is received, the controller can control the touch screen to output a plurality of the stored objects in response to the first fingerprint.

In addition, the mobile terminal further includes a camera, wherein the memory is configured to further store one or more image data and wherein if a fifth fingerprint input and a capturing command are received, the controller can store an image data captured by the camera in the memory in response to the fifth fingerprint input.

The mobile terminal further includes a wireless communication unit, wherein the controller is configured to control the wireless communication unit to transmit the captured image data to a prescribed SNS (social network service) server in response to the fifth fingerprint input. And, the mobile terminal further includes a camera and a wireless communication unit, wherein if a sixth fingerprint input and a capturing command are received, the controller is configured to control the wireless communication unit to transmit an image data captured by the camera to a prescribed counterpart terminal in response to the received sixth fingerprint input.

To further achieve these objects and other advantages and in accordance with the purpose of the invention, as embodied and broadly described herein, a method of controlling a mobile terminal includes the steps of if an input for selecting a first object related to a first function and a first fingerprint input are received, storing the first object in response to the first fingerprint input and if the first fingerprint input is received, outputting the stored first object in response to the first fingerprint input.

If an input for selecting a second object related to a second function and a second fingerprint input are received, the storing step stores the second object in response to the second fingerprint input and if the second fingerprint input is received, the outputting step can output the stored second object in response to the second fingerprint input.

Also, the first fingerprint input can be received via a fingerprint recognition sensor installed in the mobile terminal. The outputting step outputs an object list including a plurality of objects. In addition, if a third fingerprint input is received, the outputting step can arrange the object list based on a prescribed arrangement condition corresponding to the third fingerprint input.

In addition, if a fourth fingerprint input is received, the outputting step can output all of the one or more objects in response to each of the one or more fingerprint inputs.

And, if a plurality of objects are selected and the first fingerprint input is received, the storing step can store a plurality of the selected objects in response to the first fingerprint input.

If a plurality of objects are stored in response to a first fingerprint and the first fingerprint input is received, the outputting step can outputs a plurality of the stored objects in response to the first fingerprint. If a fifth fingerprint input and a capturing command are received, the storing step can store an image data captured by the camera in the memory in response to the fifth fingerprint input.

The method can further include the step of transmitting the captured image data to a prescribed SNS (social network service) server in response to the fifth fingerprint input. If a sixth fingerprint input and a capturing command are received, the method can further include the step of transmitting an image data captured by a camera to a prescribed counterpart terminal in response to the received sixth fingerprint input.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIG. 33a to FIG. 33c are diagrams illustrating a method of entering a share capturing mode and capturing a picture in the share capturing mode according to one embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the invention only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
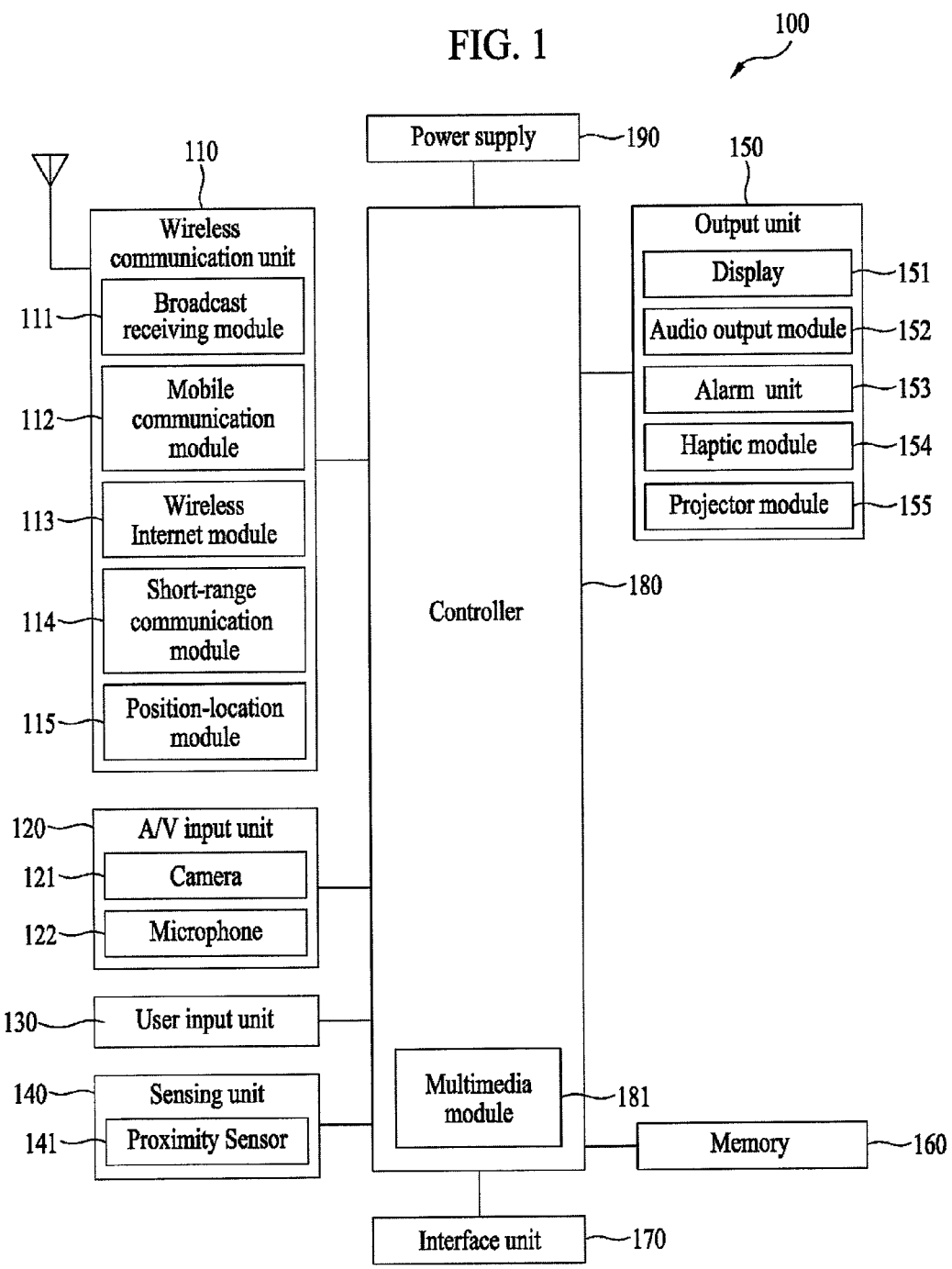
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but implementing all of the illustrated components is not a requirement. Greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless interne module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112. The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160. The mobile communication module 112 transmits/receives wireless signals to/from one or more network objects (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 can precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 can calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 for a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user can see an object in rear of a terminal body via the area occupied by the display unit 151 of the terminal body.

At least two displays 151 can be provided to the mobile terminal 100 in accordance with the implemented configuration of the mobile terminal 100. For instance, a plurality of displays can be arranged on a single face of the mobile terminal 100 by being spaced apart from each other or being built in one body. Alternatively, a plurality of displays can be arranged on different faces of the mobile terminal 100.

When the display unit 151 and a sensor for detecting a touch action (hereinafter called 'touch sensor') configures a mutual layer structure (hereinafter called 'touchscreen'), it can use the display unit 151 as an input device as well as an output device. In this instance, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it can configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display unit 151 is touched.

Referring to FIG. 1, the proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. In addition, the projector module 155 can display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. In addition, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. In addition, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output when a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an idobject module, audio input/output ports, video input/output ports, an earphone port and/or the like.

The idobject module is the chip for storing various kinds of information for authenticating a use authority of the mobile terminal 100 and can include User Identify Module (UIM), Subscriber Identity Module (SIM), Universal Subscriber Idobject Module (USIM) and/or the like. A device having the idobject module (hereinafter called 'idobject device') can be manufactured as a smart card. Therefore, the idobject device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 can include a multimedia module 181 that provides multimedia playback. The multimedia module 181 may be configured as part of the controller 180, or implemented as a separate component. Moreover, the controller 180 can perform a pattern (or image) recognizing process for recognizing a writing input and a picture drawing input performed on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
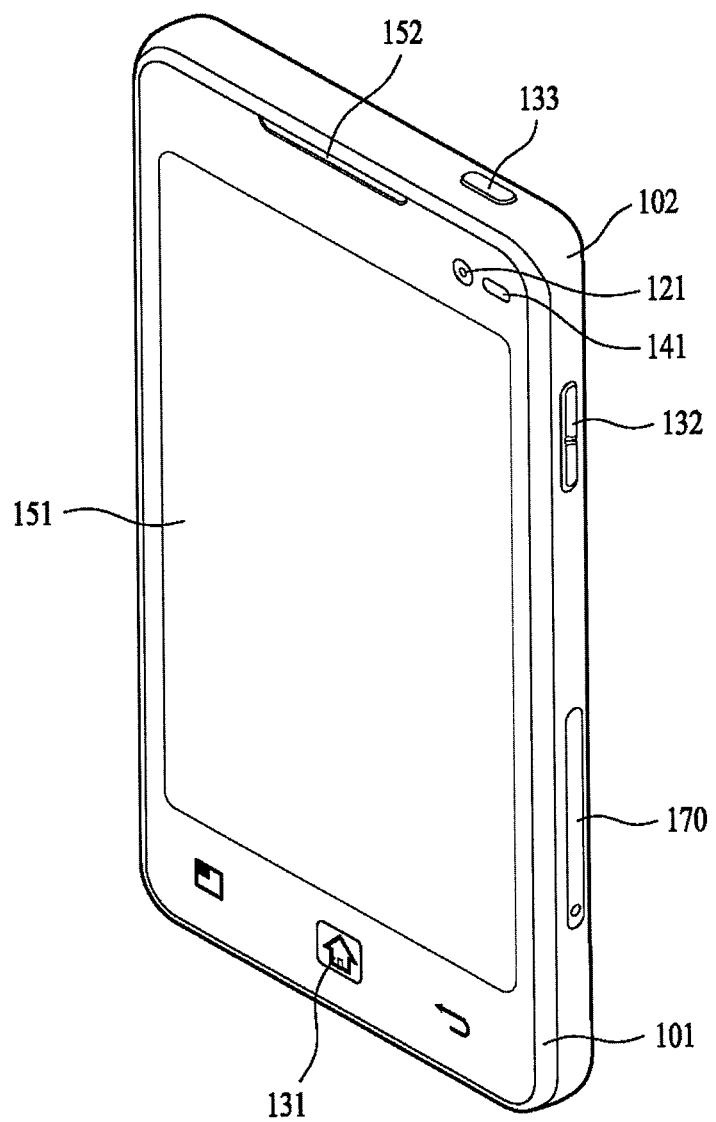
FIG. 2 is a front perspective diagram illustrating one example of a mobile or portable terminal according to an embodiment of the present invention.

Next, FIG. 2 is a front perspective diagram of a mobile terminal according to one embodiment of the present invention. The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further description will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example. A display unit 151, an audio output unit 152, a camera 121, user input units 130/131 and 132, a microphone 122, proximity sensor 141, an interface 170 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152, a command for a switching to a touch recognizing mode of the display unit 151 or the like can be input to the second manipulating unit 132. A third manipulating unit 133 can also be provided as shown in FIG. 2.

Figure 3:
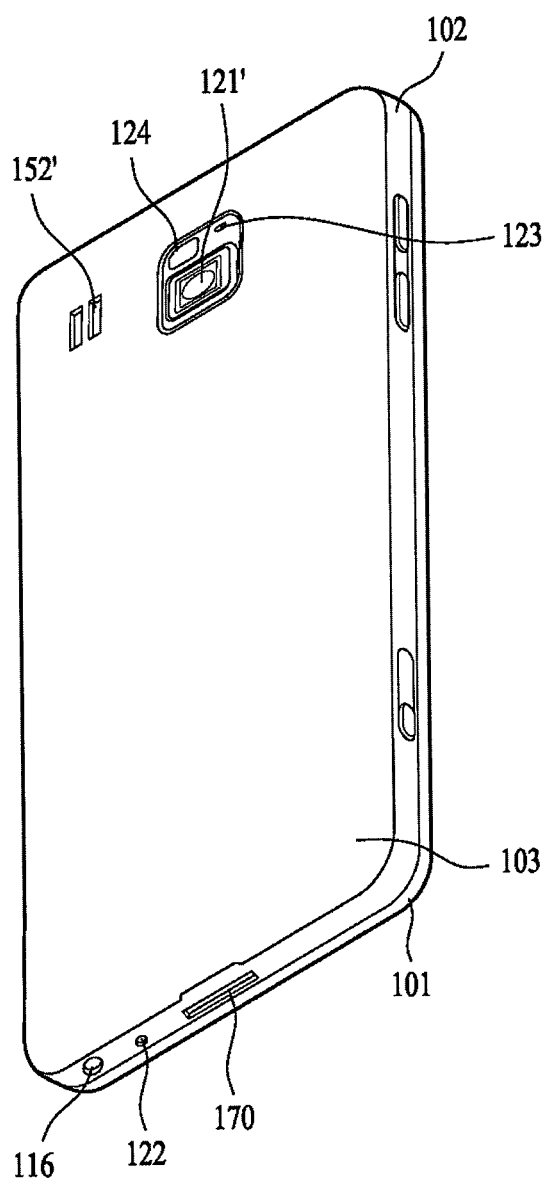
FIG. 3 is a rear perspective diagram of the mobile terminal shown in FIG. 2.

FIG. 3 is a perspective diagram of a backside of the terminal shown in FIG. 2. Referring to FIG. 3, a camera 121' can be additionally provided to a backside of the terminal body, and more particularly, to the rear case 102. The camera 121 has a photographing direction that is substantially opposite to that of the camera 121 shown in FIG. 2 and may have pixels differing from those of the camera 121.

Preferably, for instance, the camera 121 has low pixels enough to capture and transmit a picture of user's face for a video call, while the camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject when photographing the subject using the camera 121'. When a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' can implement a stereo function together with the audio output unit 152 shown in FIG. 2 and may be used for implementation of a speakerphone mode in talking over the terminal. The interface unit 170 and microphone 122 are also shown in FIG. 3.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

Figure 4:
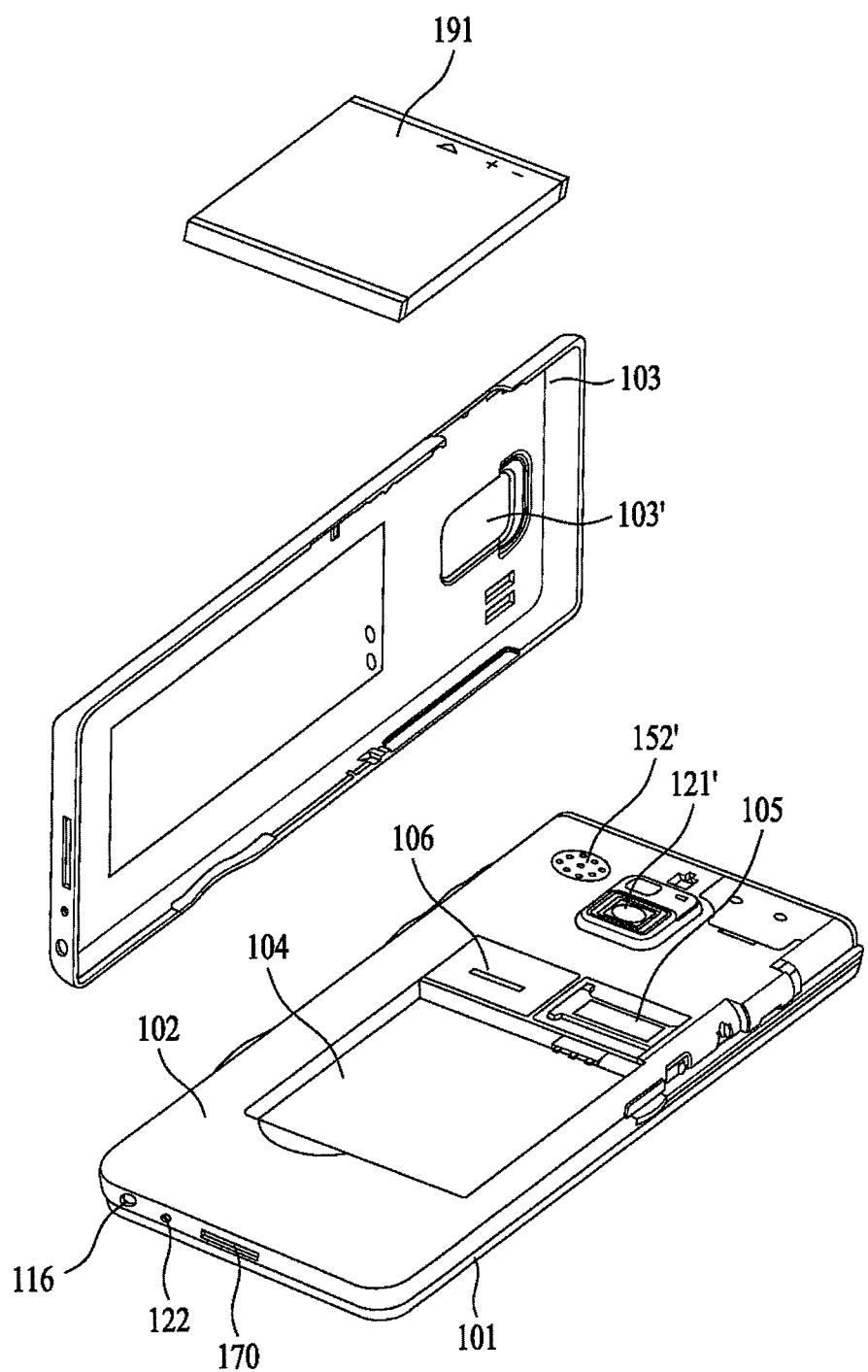
FIG. 4 is a rear perspective diagram of a surface of a rear case exposed by separating a rear cover of a mobile terminal according to one embodiment of the present invention.

FIG. 4 is a rear perspective diagram of a surface of a rear case exposed by separating a rear cover of a mobile terminal according to one embodiment of the present invention. Referring to FIG. 4, a front case 101, a rear case 102, a rear cover (or a battery cover) 103, a camera 121', an interface unit 170, a microphone 122, a speaker module or an audio output unit 152', a battery 191, a battery loading unit 104, a USIM card loading unit 105, and a memory card loading unit 106 are provided.

A space for mounting such an external part as the battery loading unit 104, the USIM card loading unit 105, the memory card loading unit 106 and the like can be provided to a surface of the rear case 102. Generally, the external part loaded on the surface of the rear case 102 is provided to extend functions of the mobile terminal 100 in order to meet the diversified functions of the mobile terminal and a variety of the consumer's needs.

As the performance of the mobile terminal gets diverse, the battery 191 can be configured as a replaceable type, as shown in FIG. 4, to complement a considerable amount of power consumption. When the replaceable type is adopted, the battery loading unit 104 is formed on the surface of the rear case 102 to enable a user to detach the corresponding battery. In this instance, a contact terminal is provided to the battery loading unit 104 to be electrically connected to a part installed within the case.

The USIM card loading unit 105 or the memory card loading unit 106 may be provided, as shown in FIG. 4, next to the battery loading unit 104. Alternatively, the USIM card loading unit 105 or the memory card loading unit 106 may be provided to a bottom surface of the battery loading unit 104. Hence, the battery 191 can be externally exposed if the battery 191 is unloaded from the battery loading unit 104. In this instance, since a size of the battery loading unit 104 is extensible, the battery 191 can be oversized.

Although FIG. 4 shows the configuration that the USIM card loading unit 105 or the memory card loading unit 106 is mounted on a backside of the rear case 102, it can be inserted in or separated from the mobile terminal 100 by being inserted in a lateral side of the rear case 102.

The rear cover 103 covers the surface of the rear case 102. Hence, the rear cover 103 can fix the battery, 191, the USIM card, the memory card and the lime not to be separated from the rear case 102 and also protects the external parts from external shocks or particles. Recently, a waterproof function is added to the mobile terminal 100. In order to prevent the external parts from contacting with water, the mobile terminal 100 can further include a waterproof structure. Hence, when rear case 102 and the rear cover 103 are connected to each other, the waterproof structure can seal up the gap between the rear case 102 and the rear cover 103. The rear cover 103 also has an opening 103' for the camera 121'. The interface unit 170 and microphone 122 are also shown.

Figure 5:
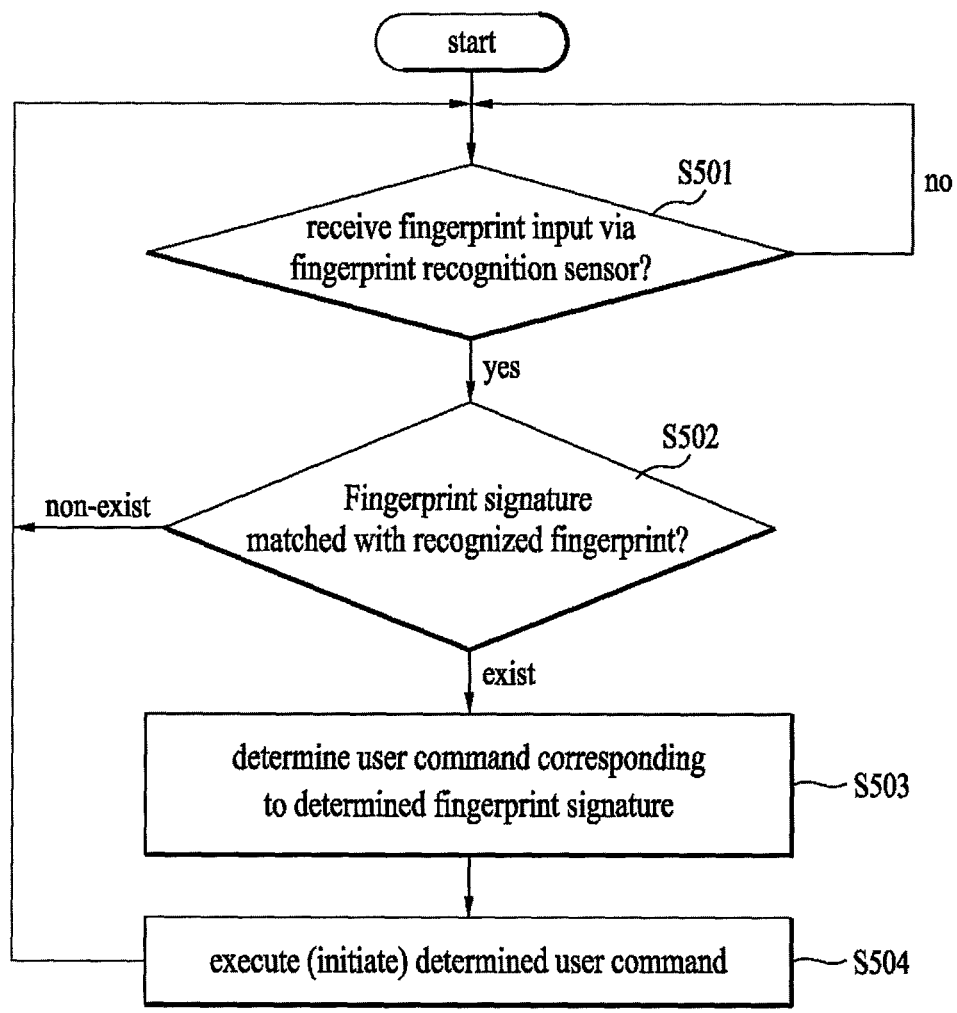
FIG. 5 is a flowchart illustrating a method of executing a user command corresponding to a recognized fingerprint according to one embodiment of the present invention.
Figure 6:
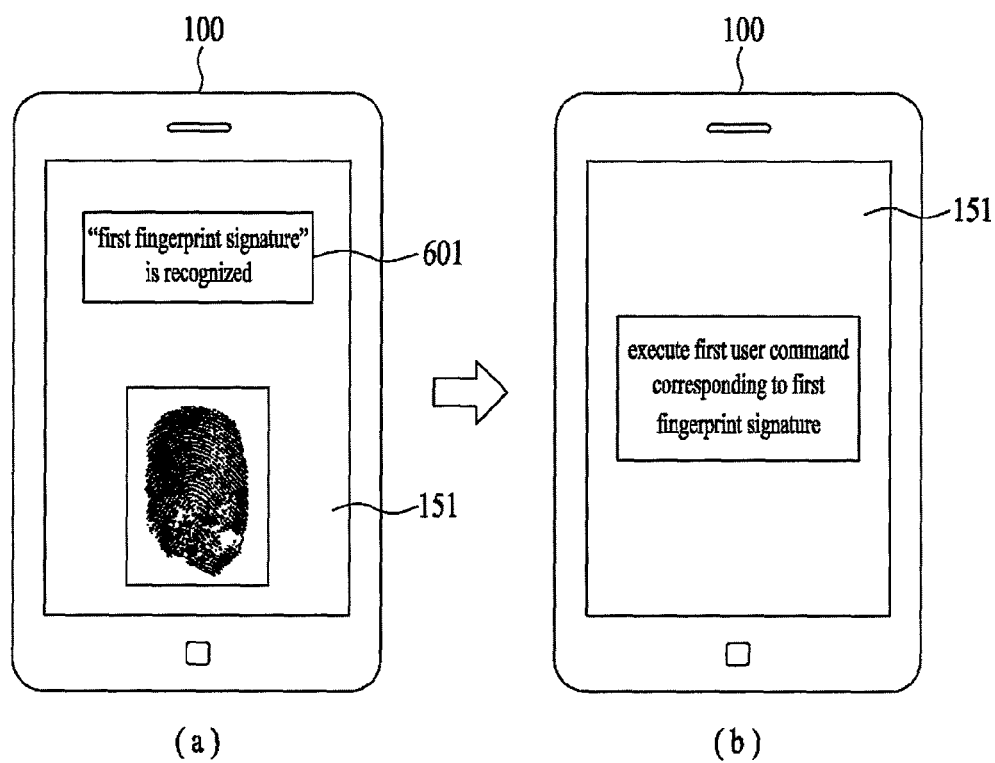
FIG. 6 is a diagram illustrating an example of a method of executing a user command corresponding to a recognized fingerprint according to one embodiment of the present invention.

Next, FIG. 5 is a flowchart illustrating a method of executing a user command corresponding to a recognized fingerprint according to one embodiment of the present invention, and FIG. 6 is a diagram illustrating an example of a method of executing a user command corresponding to a recognized fingerprint according to one embodiment of the present invention. The flowchart of FIG. 5 and the conceptual diagram of FIG. 6 are explained together.

Referring to FIGS. 5 and 6 (a), the controller 180 waits for a reception of a fingerprint input via a fingerprint recognition sensor (S501). Hence, if the fingerprint input is not received (No in S501), the controller 180 can wait for the reception of the fingerprint input by repeating the step S501. As shown in FIG. 6 (a), if the fingerprint input is received (Yes in S501), the controller 180 displays a pop-up window 601 indicating that a fingerprint is recognized and proceeds to the step S502.

In the step S502, the controller 180 determines whether there exists a fingerprint signature corresponding to the recognized fingerprint among fingerprint signatures stored in the step S501. If there exists the corresponding fingerprint signature (Yes in S502), the method proceeds to the step S503. Otherwise, the controller 180 waits for a different fingerprint recognition by repeating the step S501.

In the step S503, the controller 180 determines a user command corresponding to the recognized fingerprint signature. A user can register a fingerprint signature for a plurality of fingerprints by distinguishing a left hand from a right hand and distinguishing fingers of each hand from each other. Moreover, the user can register not only a fingerprint signature of a single user but also fingerprint signatures of a plurality of users. According to one embodiment of the present invention, as shown in an example of Table 1 in the following, a user command can correspond to each fingerprint signature.

TABLE 1

| Fingerprint signature | User command |
| --- | --- |
| First fingerprint signature | Activation/deactivation of Wi-Fi module |
| Second fingerprint signature | Activation/deactivation of Bluetooth module |
| . . . | . . . |

For instance, a first fingerprint signature in Table 1 may correspond to a fingerprint of an index finger of a left hand of a user. In particular, if a first fingerprint, which is the fingerprint of the index finger of the left hand of the user, is input via a fingerprint recognition sensor, the controller 180 can control activation/deactivation of an Wi-Fi module (refer to FIG. 6 (b)). The correspondence shown in Table 1 is just an example, by which the present invention is not limited.

Meanwhile, besides the aforementioned types of the user command, there may exist various types of user commands controlling a terminal. The number of fingerprints of a user is not sufficient to make all of the various types of user commands correspond to the number of fingerprints of the user. In addition, a specific finger is easy to be recognized by the fingerprint recognition sensor according to a position of the fingerprint recognition sensor.

Further, it may be difficult for the fingerprint recognition sensor to recognize a different finger. Hence, one embodiment of the present invention recognizes a pattern in which a fingerprint is recognized (hereinafter called a fingerprint recognition pattern) and executes a user command corresponding to the fingerprint recognition pattern instead of simply making a user command correspond to each of fingerprint signatures of recognized fingerprints. This embodiment is described with reference to FIGS. 7 and 8 as follows.

Figure 7:
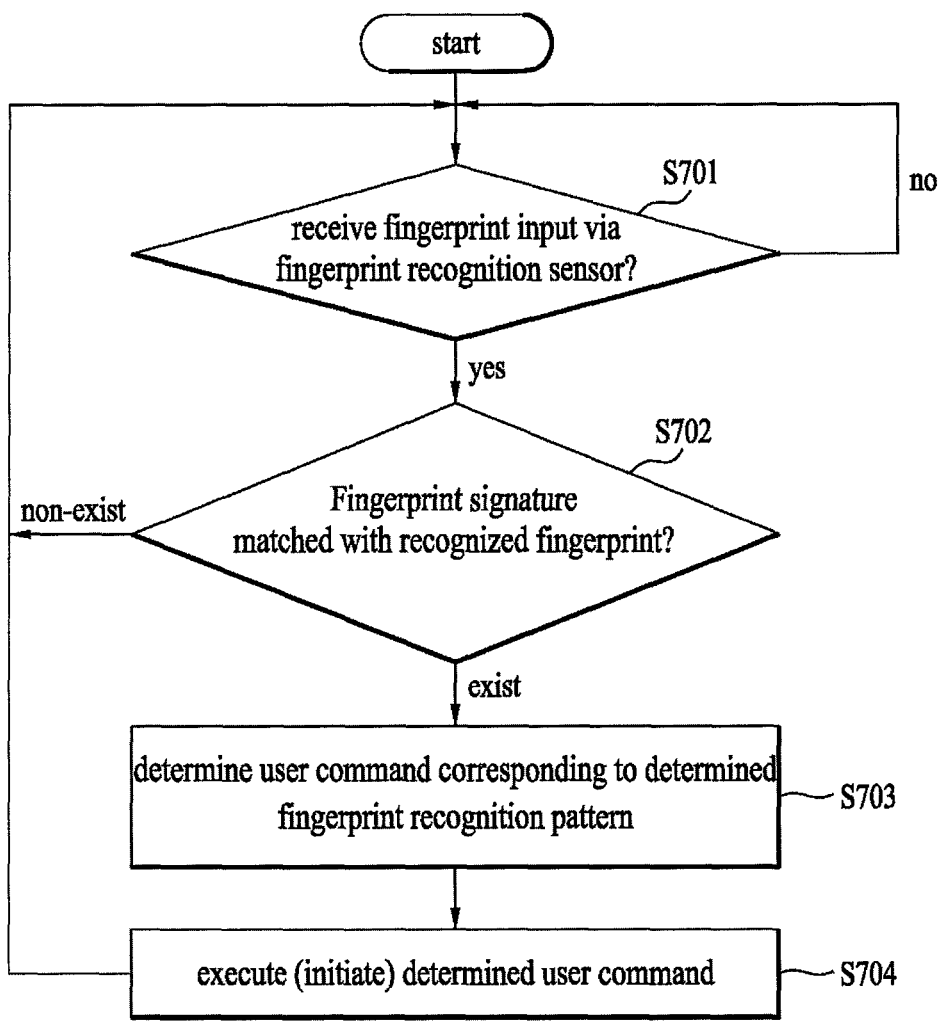
FIG. 7 is a flowchart illustrating a method of detecting a fingerprint recognition pattern and executing a user command corresponding to the detected fingerprint recognition pattern according to one embodiment of the present invention.
Figure 8:
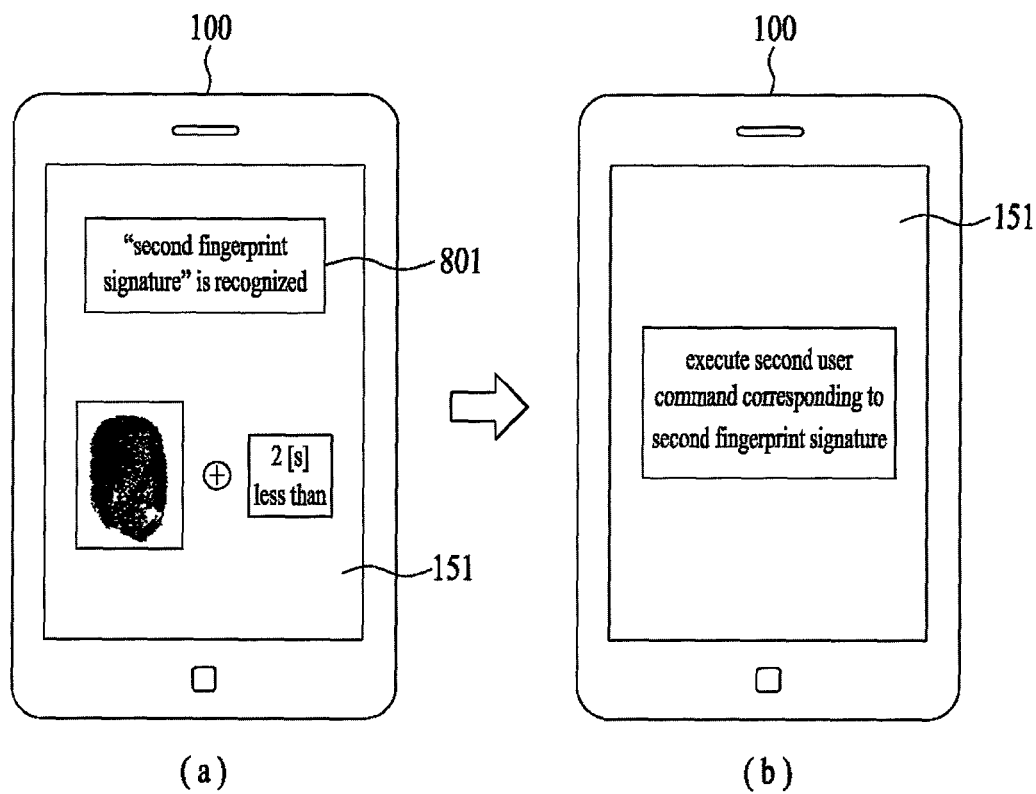
FIG. 8 is a conceptual diagram illustrating a method of detecting a fingerprint recognition pattern and executing a user command corresponding to the detected fingerprint recognition pattern according to one embodiment of the present invention.

FIG. 7 is a flowchart and FIG. 8 is a conceptual diagram illustrating a method of detecting a fingerprint recognition pattern and executing a user command corresponding to the detected fingerprint recognition pattern according to one embodiment of the present invention. In the following, the flowchart of FIG. 7 and conceptual diagram of FIG. 8 are explained together.

In the step S701, the controller 180 waits for a reception of a fingerprint input. If the fingerprint input is received (Yes in S701), the controller 180 proceeds to the step S702 (refer to FIG. 8 (*a*)). If the fingerprint input is not received (No in S701), the controller 180 waits for the reception of the fingerprint input by repeating the step S701.

In the step S702, the controller 180 determines whether there exists a fingerprint recognition pattern matched with the recognized fingerprint input among stored fingerprint recognition patterns. A fingerprint input pattern according to one embodiment of the present invention may correspond to a combination of a prescribed fingerprint signature and time for which an input of the prescribed fingerprint signature is maintained. For instance, the fingerprint input pattern can be classified into a first and a second fingerprint input pattern according to time (less than 2 seconds/more than 2 seconds) for which an input of a first fingerprint signature is maintained.

A fingerprint input pattern according to a different embodiment of the present invention may correspond to a combination of a plurality of fingerprint signatures and an order of inputting a plurality of the fingerprint signatures. For instance, if a second fingerprint signature is input after a first fingerprint signature is input, it may be designated as a first fingerprint input pattern. On the contrary, if the first fingerprint signature is input after the second fingerprint signature is input, it may be designated as a second fingerprint input pattern.

If there is no matching fingerprint recognition pattern (No in S702), the controller 180 returns to the step S701 and waits for a reception of a fingerprint input. If there exists a matching fingerprint recognition pattern, the controller 180 can proceed to the step S703. If there exists a matching fingerprint recognition pattern (Yes in S702), the controller 180 displays a pop-up window 801 indicating that the fingerprint recognition pattern is detected.

In the step S703, the controller 180 determines a user command corresponding to the fingerprint recognition pattern determined in the step S702. According to one embodiment of the present invention, as shown in an example of Table 2 in the following, the user command can correspond to each fingerprint input pattern.

TABLE 2

| Fingerprint input pattern | User command |
| --- | --- |
| First fingerprint input pattern | Display screen capturing operation |
| Second fingerprint input pattern | Activation/deactivation of airplane mode |
| ... | ... |

Subsequently, in the step S704, the controller 180 can execute the user command determined in the step S703 as shown in FIG. 8 (*b*). In particular, if a second fingerprint input pattern is received, the controller 180 can control an airplane mode to be activated or deactivated. According to one embodiment of the present invention, the airplane mode indicates a mode used for deactivating all of a plurality of modules, which should be deactivated when an airplane is taking off or landing.

Moreover, one embodiment of the present invention provides to include a scroll operation and an operation of controlling brightness of a display screen as a type of a user command. When the aforementioned type of the user command, the extent of controlling from a user is received together with the user command. This is because the extent of controlling can be controlled in proportion to input time. For instance, if a first fingerprint signature is input, the controller 180 controls the brightness of the display screen, in particular, the controller 180 can control the extent of controlling in proportion to the time for which an input of the first fingerprint signature is maintained. Meanwhile, a specific example for the user command may be non-limited by the aforementioned description. Embodiment of the present invention can be applied to a user command requiring the extent of controlling.

Meanwhile, in the embodiment mentioned earlier with reference to FIG. 5 to FIG. 8, it is assumed that a user command corresponds to a prescribed fingerprint signature and/or a prescribed fingerprint input pattern. In the following description, a method of matching the user command to the prescribed fingerprint signature and/or the prescribed fingerprint input pattern is explained.

Figure 9:
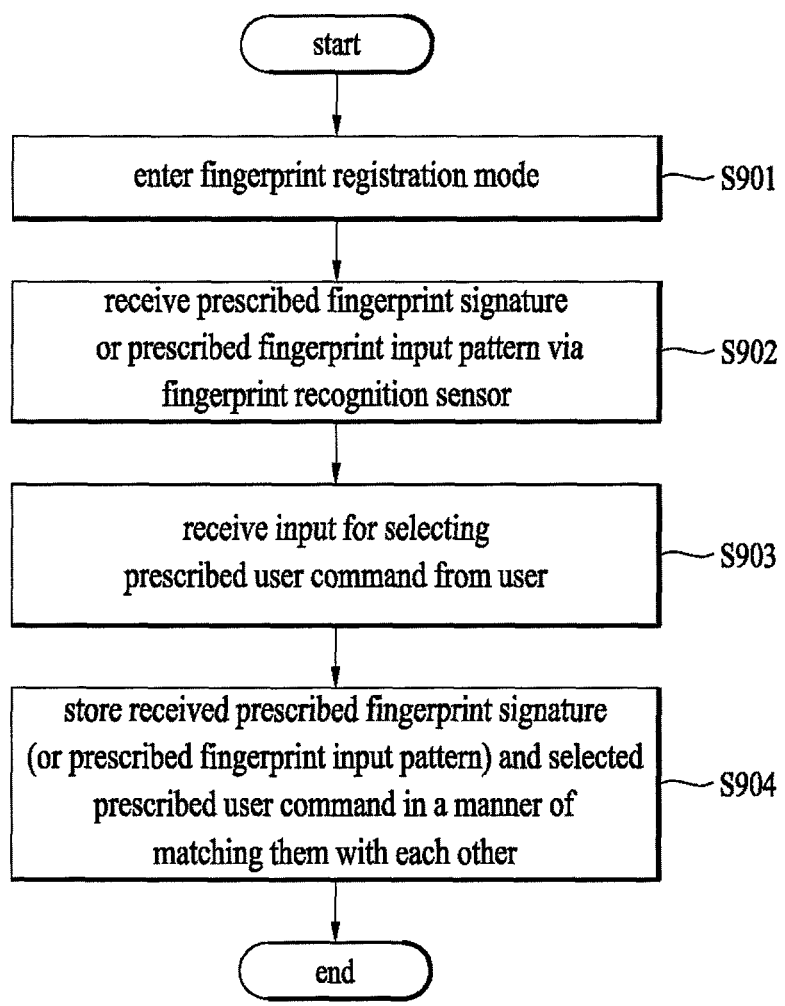
FIG. 9 is a flowchart illustrating a method of registering a user command in response to a fingerprint signature or a fingerprint input pattern according to one embodiment of the present invention.
Figure 10:
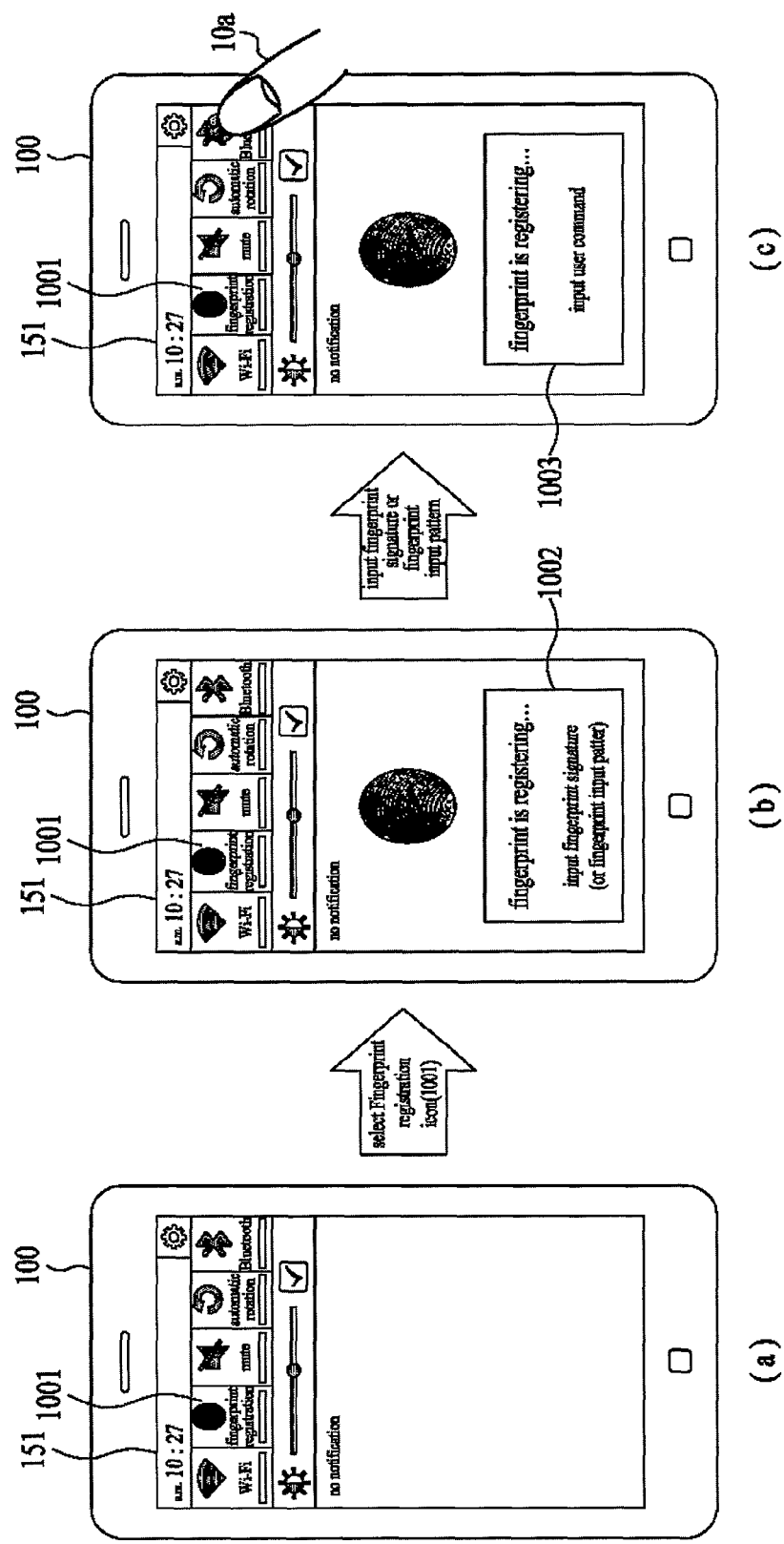
FIG. 10 is a diagram illustrating an example of a method of registering a user command in response to a fingerprint signature or a fingerprint input pattern according to one embodiment of the present invention.

In particular, FIG. 9 is a flowchart and FIG. 10 is a diagram illustrating an example of a method of registering a user command in response to a fingerprint signature or a fingerprint input pattern according to one embodiment of the present invention. In the step S901, the controller 180 enters a fingerprint registration mode. The fingerprint registration mode indicates a state to register a user command in response to a fingerprint signature or a fingerprint input pattern according to one embodiment of the present invention. Referring to FIG. 10 (*a*), according to one embodiment of the present invention, if a fingerprint registration icon 1001 is displayed on a setting menu and an input for selecting the fingerprint registration icon 1001 is received, the controller 180 can enter the user's fingerprint registration mode.

The fingerprint registration mode is separately distinguished from different modes. Otherwise, when a prescribed fingerprint is input, it may be difficult to distinguish whether the fingerprint input corresponds to a fingerprint input used for performing a user command or a fingerprint input used for registering a new user command.

Having entered the fingerprint registration mode, the controller 180 can display a guide pop-up window 1002 indicating that a fingerprint is in the middle of being registered. In addition, the guide pop-up window 1002 can further include a guide phrase making a fingerprint signature of a user or a fingerprint input pattern to be input. In the step S902, the controller 180 can receive a prescribed fingerprint signature or a prescribed fingerprint input pattern via a fingerprint recognition sensor.

Subsequently, in the step S903, the controller 180 can receive an input for selecting a prescribed user command from a user via a pop-up window 1003 (refer to FIG. 10 (*c*)). In the step S904, the controller 180 can store the received prescribed fingerprint signature (or the prescribed fingerprint input pattern) and the selected prescribed user command by matching them with each other. Data stored in the step S904 may be identical to the example mentioned earlier in Table 1 and Table 2.

In the meantime, in the example mentioned earlier with reference to FIGS. 9 and 10, a user command is selected after a fingerprint signature is recognized in the fingerprint registration mode. Yet, the above-mentioned order is not limited. In particular, a fingerprint registration can be performed in an order that the fingerprint signature is recognized after the user command is selected first in the fingerprint registration mode.

Further, according to one embodiment, the present invention sets a user command according to an application. In particular, although a first user command is registered with a first fingerprint signature in an execution screen of a first application, a second user command can be registered with the first fingerprint signature for a second application. For instance, if an index finger fingerprint is recognized in the middle of executing a "message application", a "moving backward" user command is performed. However, if the index finger fingerprint is recognized in the middle of executing a "contact list application", a "screen capture" user command can be performed.

In addition, although activation/deactivation of a specific module is explained as an example of the aforementioned user command, one embodiment of the present invention provides a user command used for arranging a contact list based on a prescribed condition. This embodiment is described with reference to FIG. 11.

Figure 11:
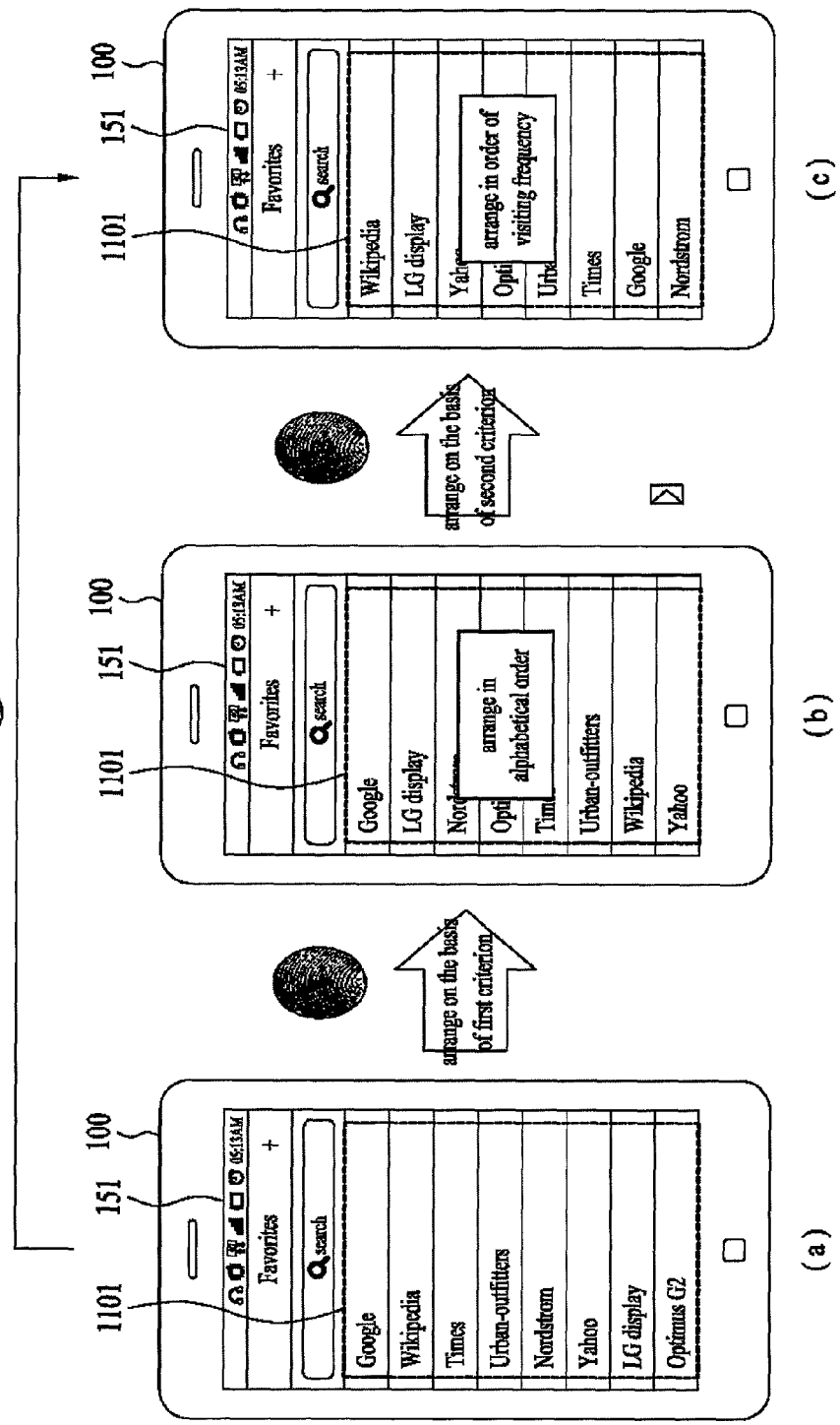
FIG. 11 is a diagram illustrating an example of a method of arranging a contact list according to one embodiment of the present invention.

In particular, FIG. 11 is a diagram illustrating an example of a method of arranging a contact list according to one embodiment of the present invention. As shown, the controller 180 can display a prescribed list when a prescribed application is executed. For instance, as shown in the example of FIG. 11, the controller 180 can display a web page favorites list 1101 in the middle of executing a web browser application.

If a first fingerprint signature (or a first fingerprint input pattern) is input, the controller 180 can arrange the output favorites list 1101 based on a first criterion (refer to FIG. 11 (b)). In addition, if a second fingerprint signature (or a second fingerprint input pattern) is input, the controller 180 can arrange the output favorites list 1101 based on a second criterion (refer to FIG. 11 (c)). In the example shown in FIG. 11, the first criterion may correspond to an alphabet order and the second criterion may correspond to an order of visiting frequency.

As mentioned in the foregoing description, a prescribed criterion for arranging a prescribed list may include at least one of an order of recently used, an order of frequently used, a Korean, English, etc. alphabet order and an alphabet order. Although the web page favorites list is explained as an example of the prescribed list in the foregoing description, the prescribed list is not limited to the example. The prescribed list may include a contact list or a transmission/reception message list and may be non-limited to a specific type of a list.

One embodiment of the present invention outputs a current situation of registration with a list to efficiently manage a registered fingerprint signature or a registered fingerprint input pattern. This embodiment is described with reference to FIG. 12. In particular, FIGS. 12 (a) and 12 (b) are diagrams illustrating examples of a method of displaying a current situation of fingerprint registration with a list.

Figure 12:
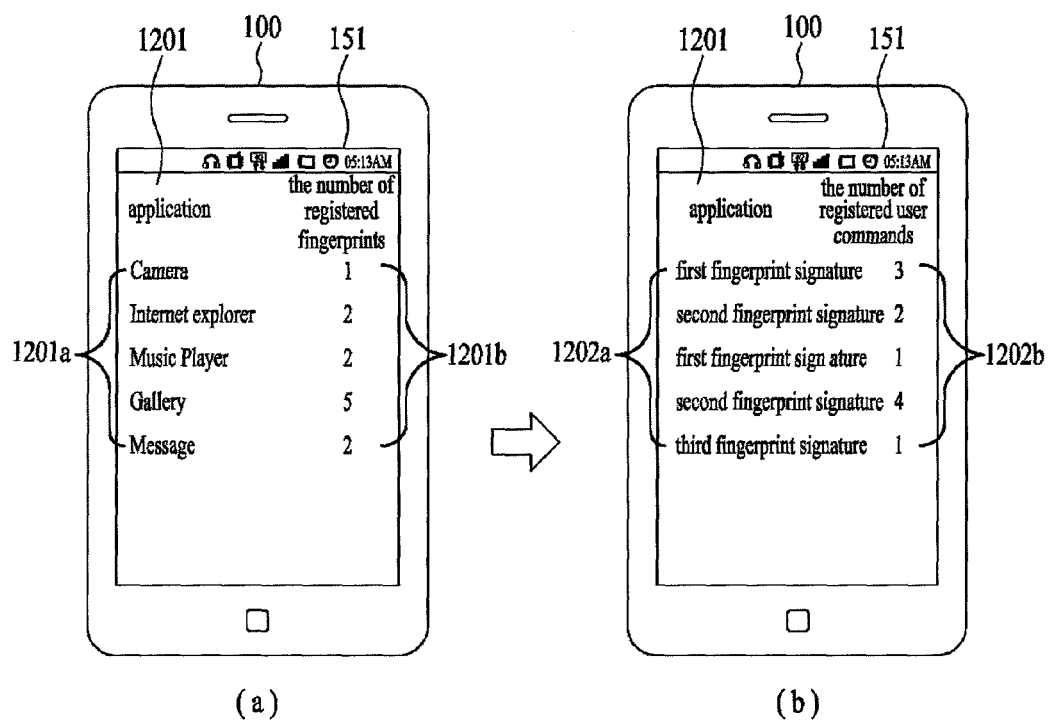
FIGS. 12 (*a*) and (*b*) are diagrams illustrating examples of a method of displaying a current situation of fingerprint registration with a list.

A first example of a method of displaying a list is explained with reference to FIG. 12 (a). As shown, the number of registered fingerprints is displayed with a list according to an application. In particular, as shown in FIG. 12 (a), if an input for requesting a current situation of fingerprint registration is received, the controller 180 can output a list displaying (including) the number of fingerprint signatures (or the number of fingerprint input patterns) registered according to an application.

A second example of a method of displaying a list is explained with reference to FIG. 12 (b). One embodiment of the present invention displays the number of user commands registered according to each fingerprint signature (or fingerprint input pattern). In particular, as shown in FIG. 12 (b), if an input for requesting a current situation of fingerprint registration is received, the controller 180 can output a list displaying (including) the number of user commands registered according to a fingerprint signature (or fingerprint input pattern). According to one embodiment of the present invention, since a fingerprint signature and a user command can be stored by being matched with each other for each application, a plurality of user commands can be stored in a single fingerprint signature (matching with each of a plurality of applications).

Figure 13A:
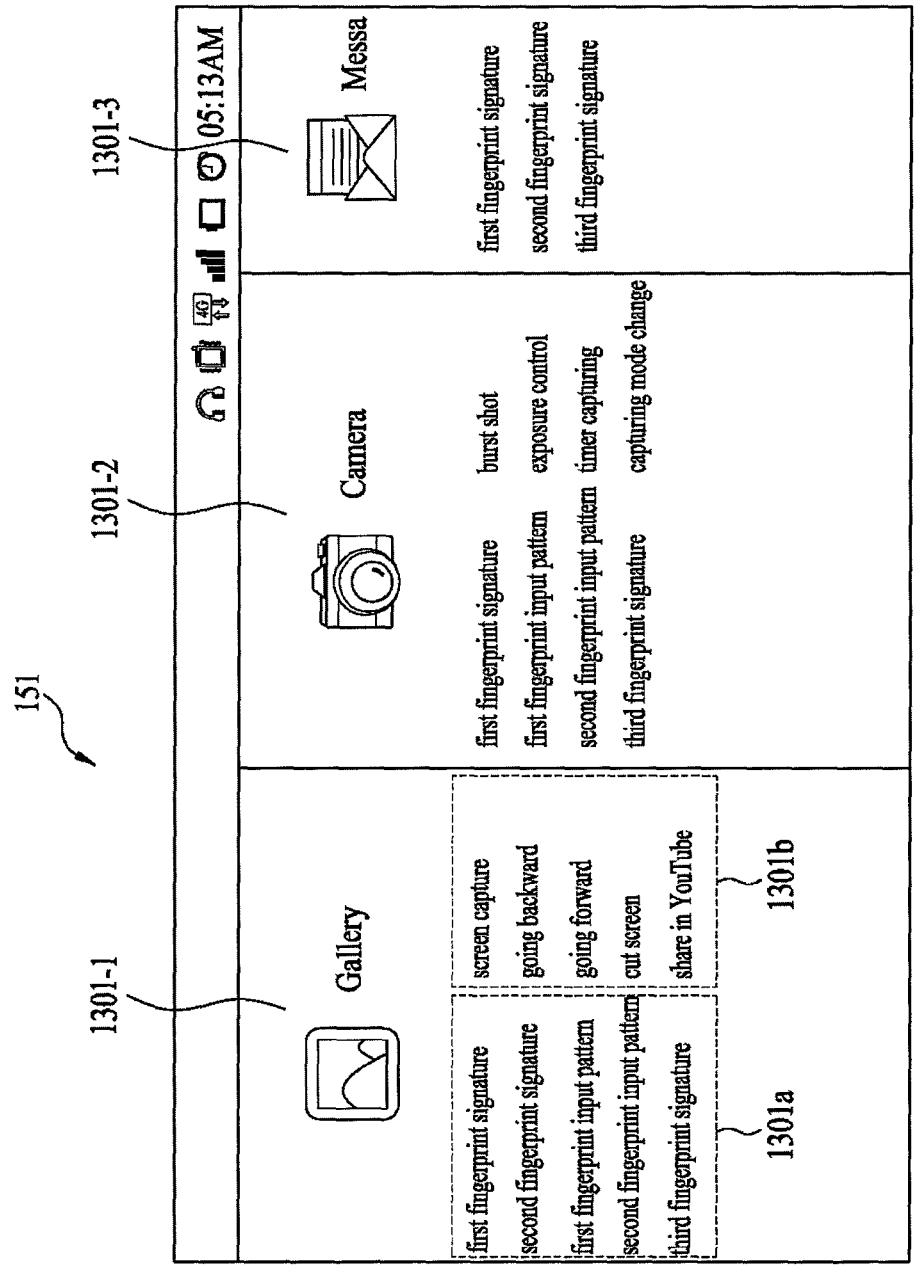
FIG. 13*a* and FIG. 13*b* are diagrams illustrating a different example of a method of displaying a current situation of fingerprint registration with a list.
Figure 13B:
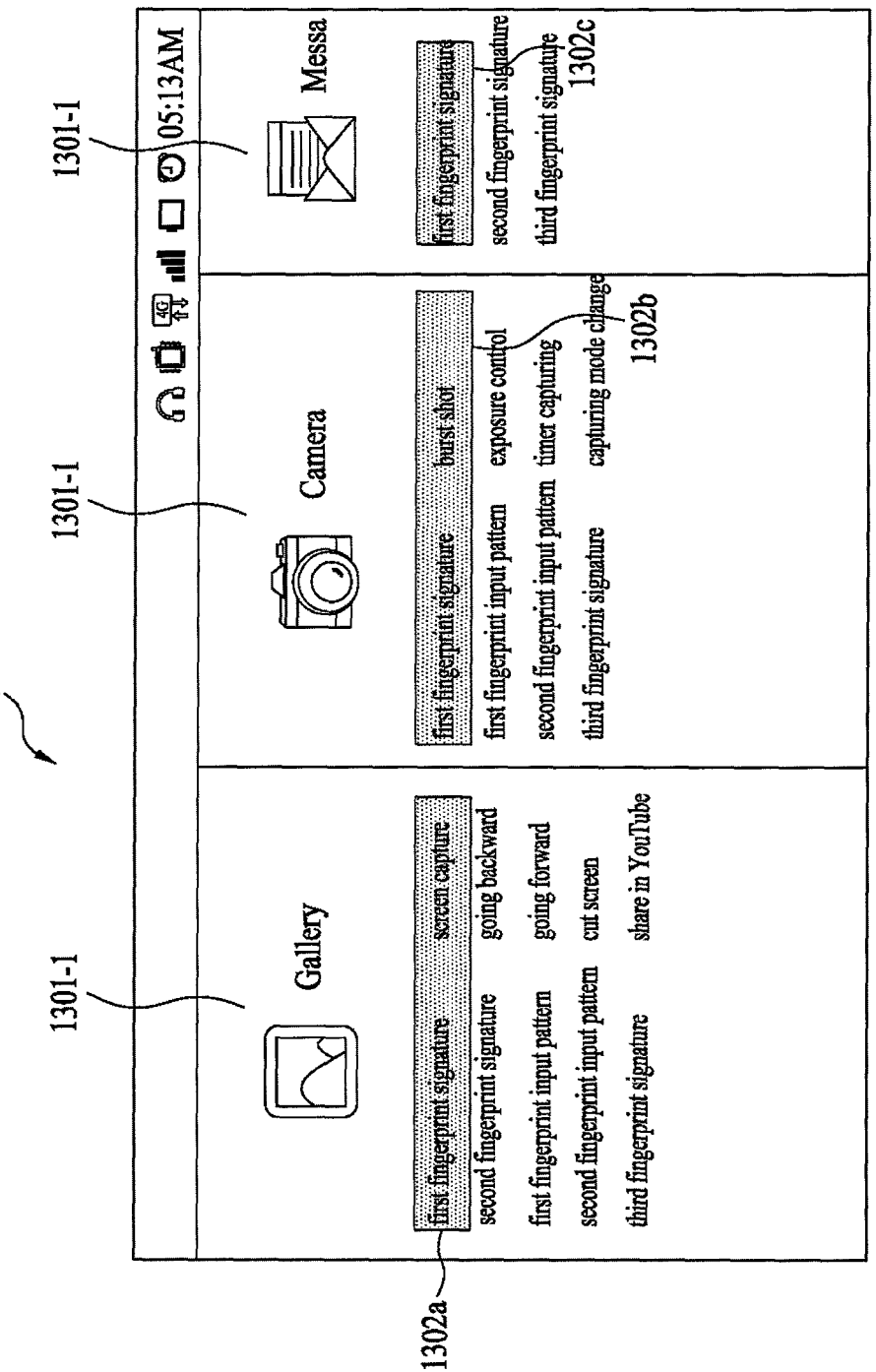

Next, FIGS. 13 (a) and 13 (b) are diagrams illustrating a different example of a method of displaying a current situation of fingerprint registration with a list. For clarity, a form constructing the exterior of a mobile terminal 100 is omitted. Instead, FIG. 13a and FIG. 13b show a state output by the display unit 151 of the mobile terminal only.

According to the description mentioned earlier, in one embodiment of the present invention, a user command corresponding to a fingerprint signature is differently registered in accordance with an application. Hence, if a fingerprint signature list registered according to an application and a fingerprint input pattern are provided together, it would be convenient for a user.

Referring to FIG. 13a, a list of a current situation of fingerprint registration is output according to each of applications (1301-1 to 1301-3). If it is explained based on a gallery application 1301-1, user commands 1301b matched with each of fingerprint signatures or each of fingerprint input patterns 1301a are displayed with a list. A user command matched with a first fingerprint signature corresponds to a "screen capture" operation in the gallery application 1301-1. However, the first fingerprint signature is matched with a "burst shot" operation in a camera application 1301-2 and the first fingerprint signature is matched with a different operation in a message application 1301-3 and stored.

A user can easily know a user command registered for a prescribed fingerprint signature or a prescribed fingerprint recognition pattern via a current situation of fingerprint registration registered according to an application which is provided according to one embodiment of the present invention. Moreover, according to one embodiment of the present invention, as shown in FIG. 13a, if a prescribed fingerprint is recognized in the current situation of fingerprint registration, a user command corresponding to the fingerprint can be distinctively displayed. This is because it is difficult to easily identify a fingerprint (of a finger) based on a form of the fingerprint only.

In particular, if a fingerprint input is received from a user while a current situation of fingerprint registration is output, the controller 180 can distinctively display a user command corresponding to the received fingerprint input. For instance, as shown in FIG. 13b, if a first fingerprint signature is received from the user while the current situation of fingerprint registration is displayed, the controller 180 can distinctively display the first fingerprint signature and a user command(s) corresponding to the first fingerprint signature 1302a to 1302c.

Meanwhile, the aforementioned embodiment of the present invention provides a method of controlling a function of a mobile terminal to be easily executed using a fingerprint. Since a fingerprint input can accurately identifying a specific person, the fingerprint input has a high security level. Hence, one embodiment of the present invention described in the following provides a controlling method using the security of a fingerprint.

Figure 14:
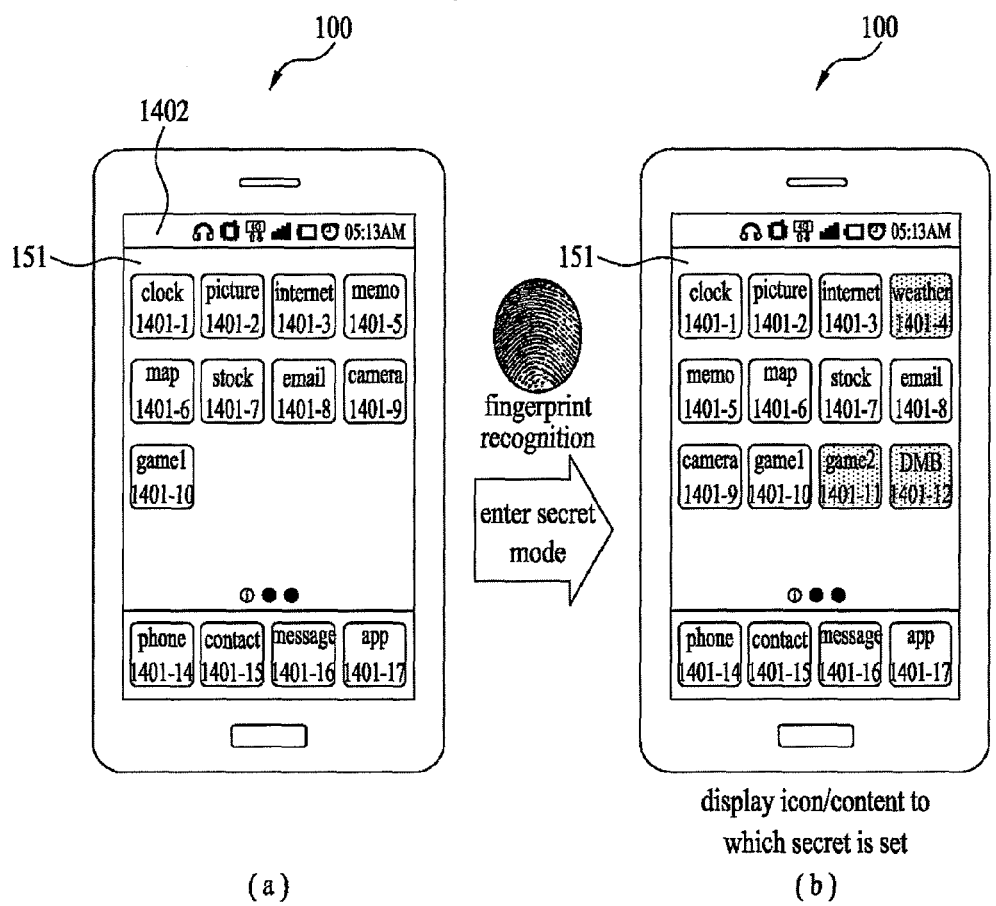
FIG. 14 is a diagram illustrating a state of a mobile terminal 100 to explain entering a secret mode using a fingerprint input according to one embodiment of the present invention.

In particular, FIG. 14 is a diagram illustrating a state of a mobile terminal 100 to explain entering a secret mode using a fingerprint input according to one embodiment of the present invention. An indicator bar 1402 including an indicator indicating a present time, an indicator indicating a signal sensitivity of a mobile communication, an indicator indicating a remaining battery amount and the like can be displayed on the top part of a touch screen 151.

Further, a plurality of execution icons 1401 are displayed on the touch screen 151 of the mobile terminal 100. The plurality of the execution icons 1401 can be activated to execute an application corresponding to each icon of a plurality of the execution icons. For instance, if a touch input for activating the clock execution icon 1401-1 is received, the controller 180 can execute a clock application corresponding to the clock execution icon 1401-1.

In one embodiment of the present invention, a mode is classified into a normal mode and a secret mode via a fingerprint recognition sensor. One embodiment of the present invention provides that an execution icon, which is provided to a specific user only, is provided to the specific user in the secret mode.

FIG. 14 (b) is a diagram showing a state of a secret mode according to one embodiment of the present invention. As shown, the controller 180 can switch to the secret mode when a prescribed fingerprint is recognized via a fingerprint recognition sensor. The controller 180 can further display at least one secret-set execution icon in the secret mode.

For instance, in FIG. 14 (b), if it is assumed that an execution icon 1401-4, an execution icon 1401-11 and an execution icon 1401-12 correspond to the secret-set execution icon, the controller 180 can control the execution icon 1401-4, the execution icon 1401-11 and the execution icon 1401-12 to be further displayed when entering the secret mode. The controller 180 can display the secret-set execution icon by being identified from different icons in the secret mode. For instance, as shown in FIG. 14 (b), the secret-set icon can be displayed by a first color.

Also, in one embodiment of the present invention, the aforementioned operation can be identically applied to not only an execution icon but also various contents. In this instance, content may refer to content included in a web page and/or transmitted/received text message content as well as the aforementioned execution icon. Further, one embodiment of the present invention additionally operates in a separate secret mode according to a prescribed fingerprint. For instance, when a user enters a secret mode using an index finger, the present invention can operate in a secret mode (first secret mode) corresponding to the index finger. When the user enters the secret mode using a middle finger, the present invention can operate in a secret mode (second secret mode) corresponding to the middle finger.

Figure 15:
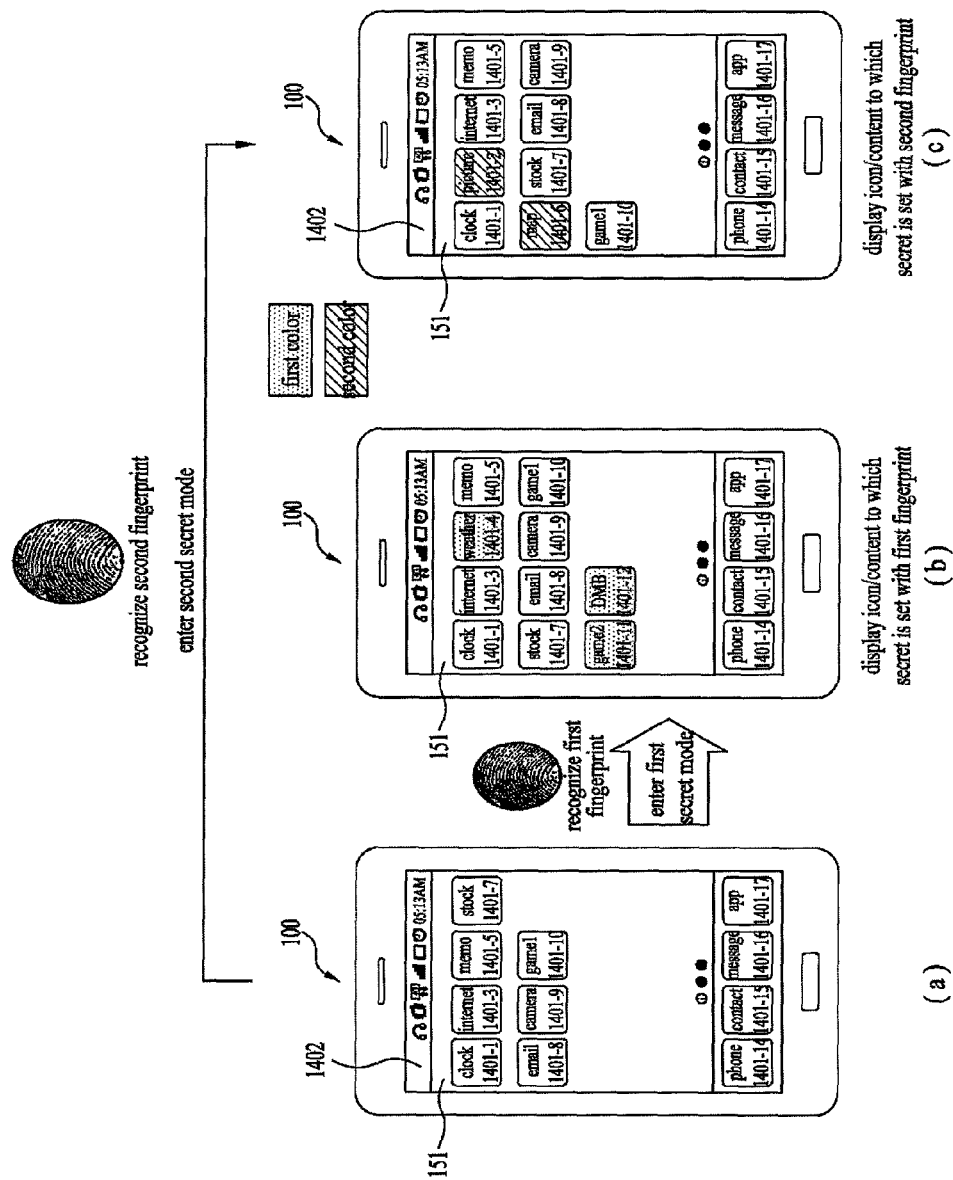
FIG. 15 is a diagram illustrating an example of a method of operating in a separate secret mode to correspond to a recognized fingerprint according to one embodiment of the present invention.

In particular, FIG. 15 is a diagram illustrating an example of a method of operating in a separate secret mode to correspond to a recognized fingerprint according to one embodiment of the present invention. FIG. 15 (a) shows a state of a mobile terminal operating in a normal mode and a plurality of application execution icons 1401 are displayed in the diagram.

As shown in FIG. 15 (b), if a first fingerprint is recognized, the controller 180 enters a first secret mode and can display icons to which secret is set in response to the first fingerprint. In an example shown in FIG. 15 (b), an icon 1401-4, an icon 1401-11 and an icon 1401-12 correspond to the execution icons to which secret is set in response to the first fingerprint. As shown in FIG. 15 (b), the controller 180 according to one embodiment of the present invention can display the execution icons to which secret is set in response to the first fingerprint by a first color to identify the execution icons from different execution icons.

As shown in FIG. 15 (c), if a second fingerprint is recognized, the controller 180 enters a second secret mode and can display icons to which secret is set in response to the second fingerprint. In an example shown in FIG. 15 (c), an icon 1401-2 and an icon 1401-6 correspond to the execution icons to which secret is set in response to the second fingerprint. As shown in FIG. 15 (c), the controller 180 can display the execution icons to which secret is set in response to the second fingerprint by a second color to identify the execution icons from different execution icons.

For instance, the first fingerprint may correspond to an index finger fingerprint of a specific user and the second fingerprint may correspond to a middle finger fingerprint of the specific user. In particular, a user registers a specific execution icon or a specific content according to a finger of the user and may be then able to use the specific execution icon or the specific content by easily registering and calling the specific execution icon or the specific content. As a different example, the first fingerprint may correspond to a fingerprint of a first user and the second fingerprint may correspond to a fingerprint of a second user. In this instance, when a single mobile terminal is used by a plurality of users, it may be able to easily register and call a dedicated execution icon of a specific user or content for the specific user.

Meanwhile, if a plurality of execution icons or a plurality of contents are registered according to a plurality of fingerprints, there may exist confusion about what objects are registered with a fingerprint. Hence, one embodiment of the present invention gives master authority to a prescribed fingerprint, and if the prescribed fingerprint is recognized, display secret-set execution icon and/or content in response to all fingerprints. This embodiment is described with reference to FIG. 16.

Figure 16:
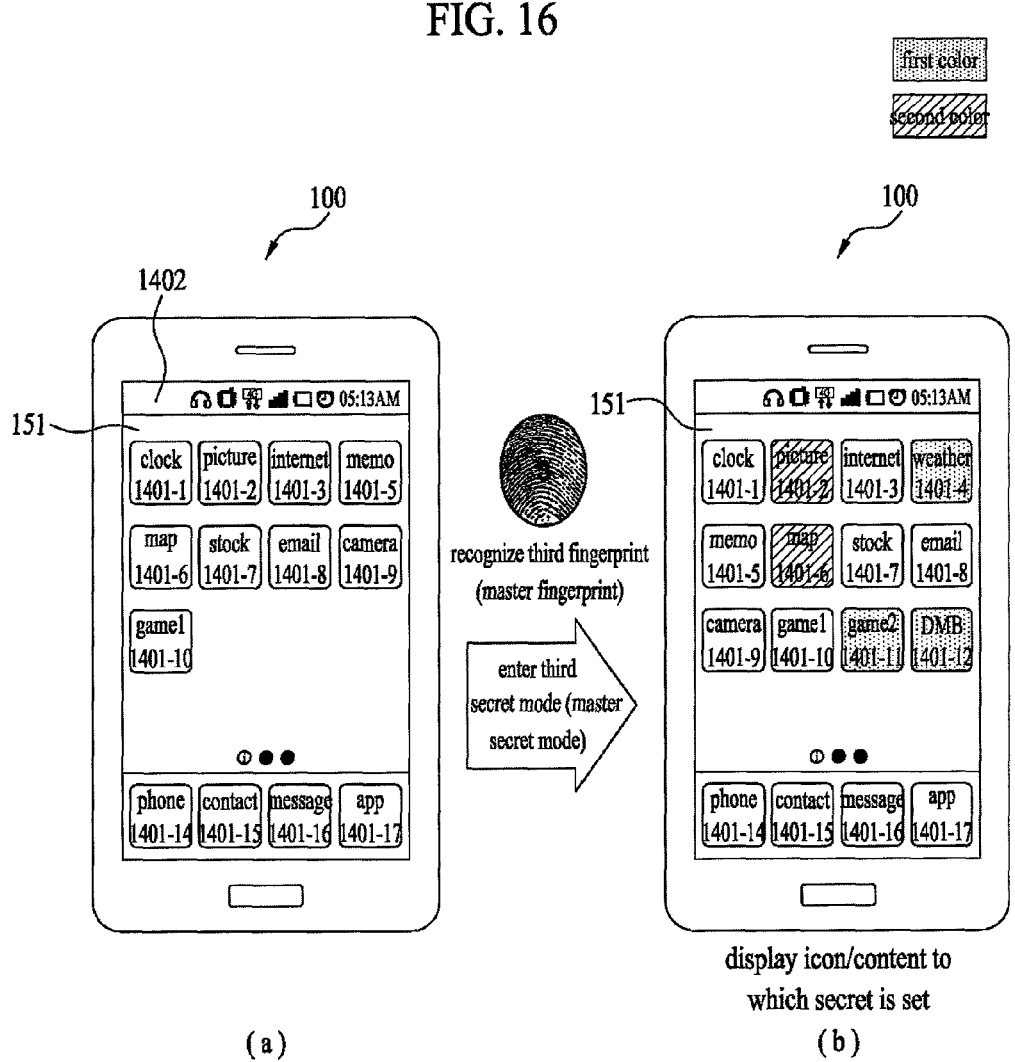
FIG. 16 is a diagram illustrating an example of an execution state of a master secret mode according to one embodiment of the present invention.

In particular, FIG. 16 is a diagram illustrating an example of an execution state of a master secret mode according to one embodiment of the present invention. Assume that a secret setting of the example to be explained in FIG. 16 is identical to the secret setting of the example explained in FIG. 15. In particular, assume that an icon 1401-4, an icon 1401-11 and an icon 1401-12 correspond to the execution icons to which secret is set in response to a first fingerprint and an icon 1401-2 and an icon 1401-6 correspond to the execution icons to which secret is set in response to a second fingerprint.

A master secret mode according to one embodiment of the present invention indicates a mode displaying secret-set execution icon and/or content in response to all fingerprints. In addition, a master fingerprint indicates a fingerprint configured to enter the master secret mode. If a third fingerprint configured as the master fingerprint is recognized by a fingerprint recognition sensor, the controller 180 can operate in the master secret mode.

In addition, the controller 180 can control the secret-set execution icon to be displayed in response to the first fingerprint and the second fingerprint. Meanwhile, although the example explained in FIG. 16 shows an example of the execution icon which is configured in response to the first fingerprint and the second fingerprint, if there is an execution icon configured in response to a different fingerprint, the controller 180 can control the execution icon configured in response to the different fingerprint to be displayed as well.

According to the aforementioned one embodiment of the present invention, it is proposed that secret setting for a plurality of execution icons and/or a plurality of contents is to be performed according to a prescribed fingerprint. As the number of the secret-set execution icons and/or contents increases, it may be required to have a method of displaying the aforementioned kinds of objects by clearly arranging the objects. Hence, one embodiment of the present invention displays the objects to which a secret is set according to a prescribed fingerprint by putting the objects together. This embodiment is described with reference to FIGS. 17*a* and 17*b*.

Figure 17A:
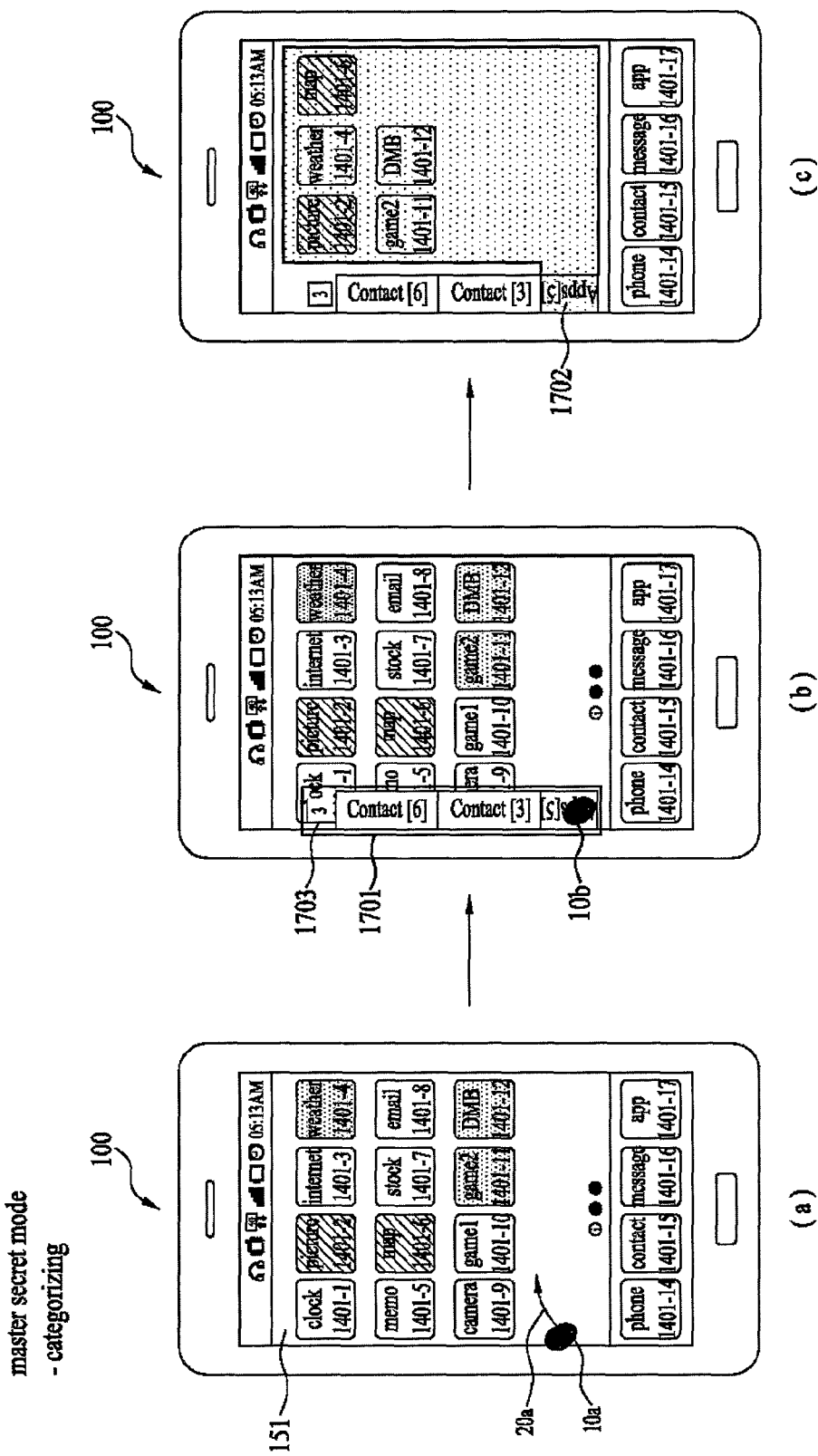
FIG. 17*a*, FIG. 17*b* and FIG. 18 are diagrams illustrating examples of a method of displaying secret-set objects by putting the objects together in response to a master fingerprint according to one embodiment of the present invention.
Figure 17B:
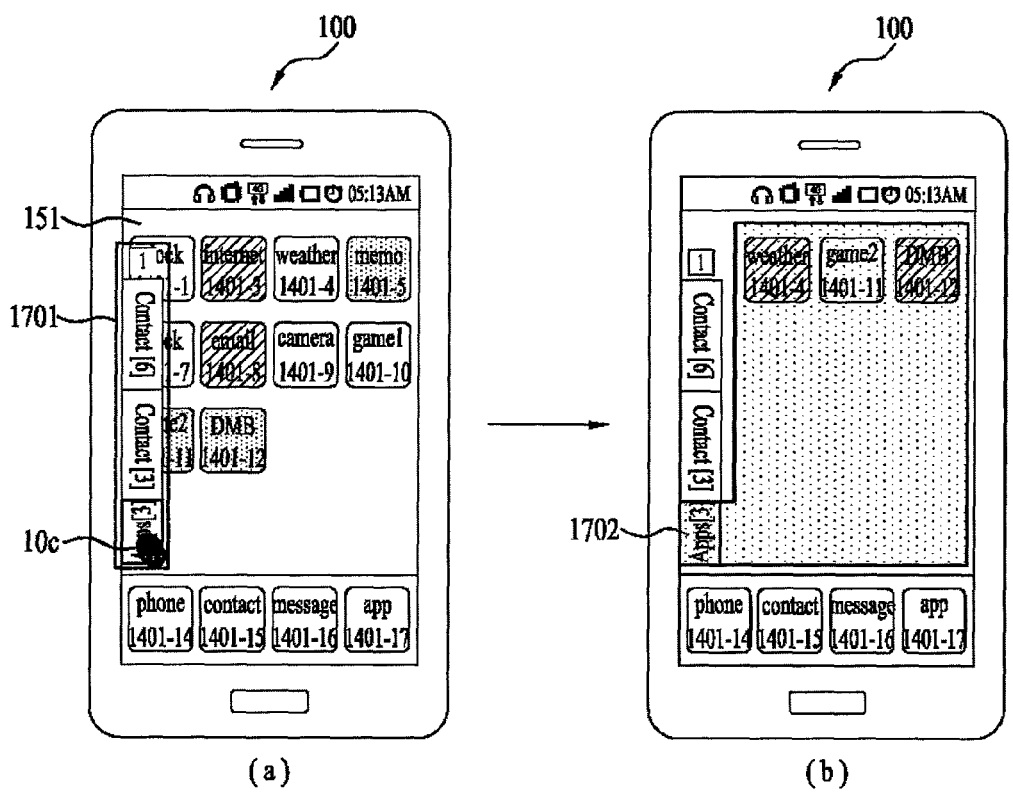
Figure 18:
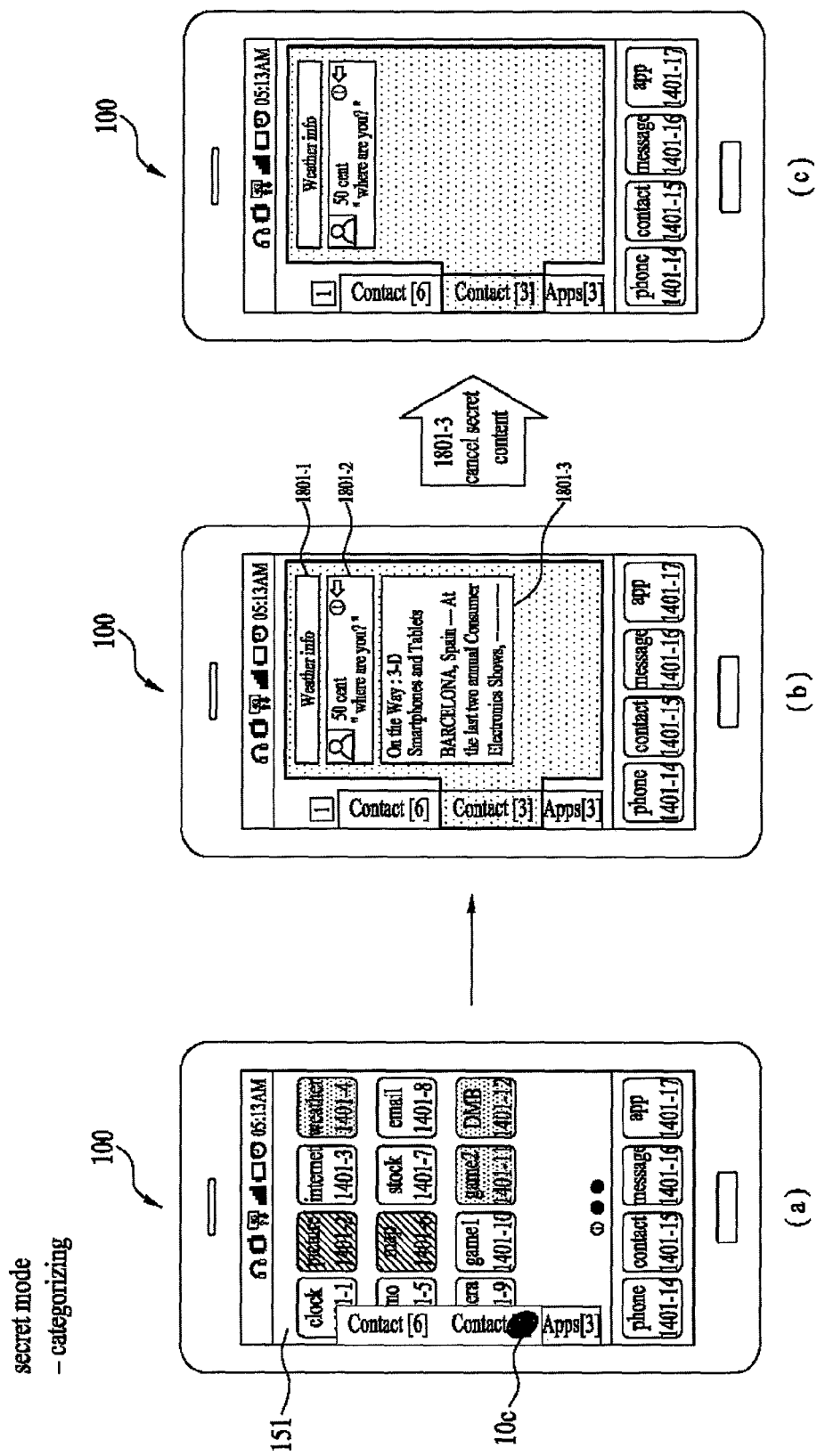

FIG. 17*a* to FIG. 18 are diagrams illustrating examples of a method of displaying secret-set objects by putting the objects together in response to a master fingerprint according to one embodiment of the present invention. FIG. 17*a* (a) shows an execution state displayed in a master secret mode and a plurality of execution icons are displayed in the execution state. In addition, assume that a part 1401-4, 1401-11 and 1401-12 of a plurality of the execution icons 1401 correspond to icons to which secret is set in response to a first fingerprint and a part 1401-12 and 1401-6 of different execution icons correspond to icons to which secret is set in response to a second fingerprint.

If a command 10*a*/20*a* for calling a categorizing menu 1701 is received, the controller 180 can display the categorizing menu 1701 in the display unit 151 (refer to FIG. 17*a* (b)). The categorizing menu 1701 indicates a menu configured to separately display the objects to which secret is set only according to a category or irrespective of the category.

In an example shown in FIG. 17*a*, the categorizing menu 1701 is classified according to a category. The category includes "contact", "contents" and "application (App)." One embodiment of the present invention displays the number of objects to which secret is set according to a category 1702. Referring to an identification number 1702, the user can see the number of objects included in an "application" category corresponds to five. In addition, referring to FIG. 17*a* (c), the user can see the number of objects included in an "contact" category and a "content" category corresponds to six and three, respectively.

In one embodiment of the present invention, a fingerprint indicator 1703 can be further displayed to identify a currently recognized fingerprint. If the third fingerprint is currently recognized (third secret mode or master secret mode), the fingerprint indicator can indicate that the currently recognized fingerprint corresponds to the third fingerprint.

If an input 10*b* for selecting the "application" category is received, the controller 180 can display at least one execution icon (1401-2, 1401-4, 1401-6, 1401-11 and 1401-12 shown in FIG. 17*a* (c)) to which secret is set in response to the first fingerprint and the second fingerprint among execution icons 1401 of an application.

According to the embodiment shown in FIG. 17*a*, categorizing can be provided to the execution icons and/or contents to which secret is set. In addition, the embodiment of the present invention explained in FIG. 17*a* can be provided to not only the master fingerprint but also a non-master fingerprint. Regarding the aforementioned embodiment, FIG. 17*b* shows categorizing embodiment in a first secret mode by a prescribed fingerprint (first fingerprint).

FIG. 17*b* is a diagram illustrating a different example of categorizing in a first secret mode according to a first fingerprint. In particular FIG. 17*b* (a) shows a state diagram in the first secret mode and the aforementioned categorizing menu 1701 is displayed in the state diagram. If an input 10*c* for selecting an "application" category on the categorizing menu 1701, the controller 180 can separately display execution icons configured by a first fingerprint only. Referring to FIG. 17*b* (b), assume that the execution icons configured by the first fingerprint correspond to an execution icon 1401-4, an execution icon 1401-11 and an execution icon 1401-12.

Subsequently, as shown in FIG. 18 (*a*), if an input 10*c* for selecting a "content" category is received, the controller 180 can display at least one content to which secret is set in response to a first fingerprint and a second fingerprint (refer to FIG. 18 (*b*)). According to embodiment of the present invention explained with reference to FIG. 18, it can provide a screen (hereinafter, a categorizing screen) displaying a plurality of contents to which secret is set by putting a plurality of the contents together.

Referring to FIG. 18 (*b*), assume that the contents to which secret is set in response to the first fingerprint and the second fingerprint correspond to first to third content (1801-1 to 1801-3). If an input for cancelling the secret set to the third content is received, the controller 180 can control the third content from which the secret setting is cancelled to be not displayed anymore in the categorizing screen. So far, the method of displaying an execution icon and/or content to which secret is set is explained. In the following, embodiment of setting secret to the execution icon and/or the content in response to a prescribed fingerprint is explained.

Figure 19:
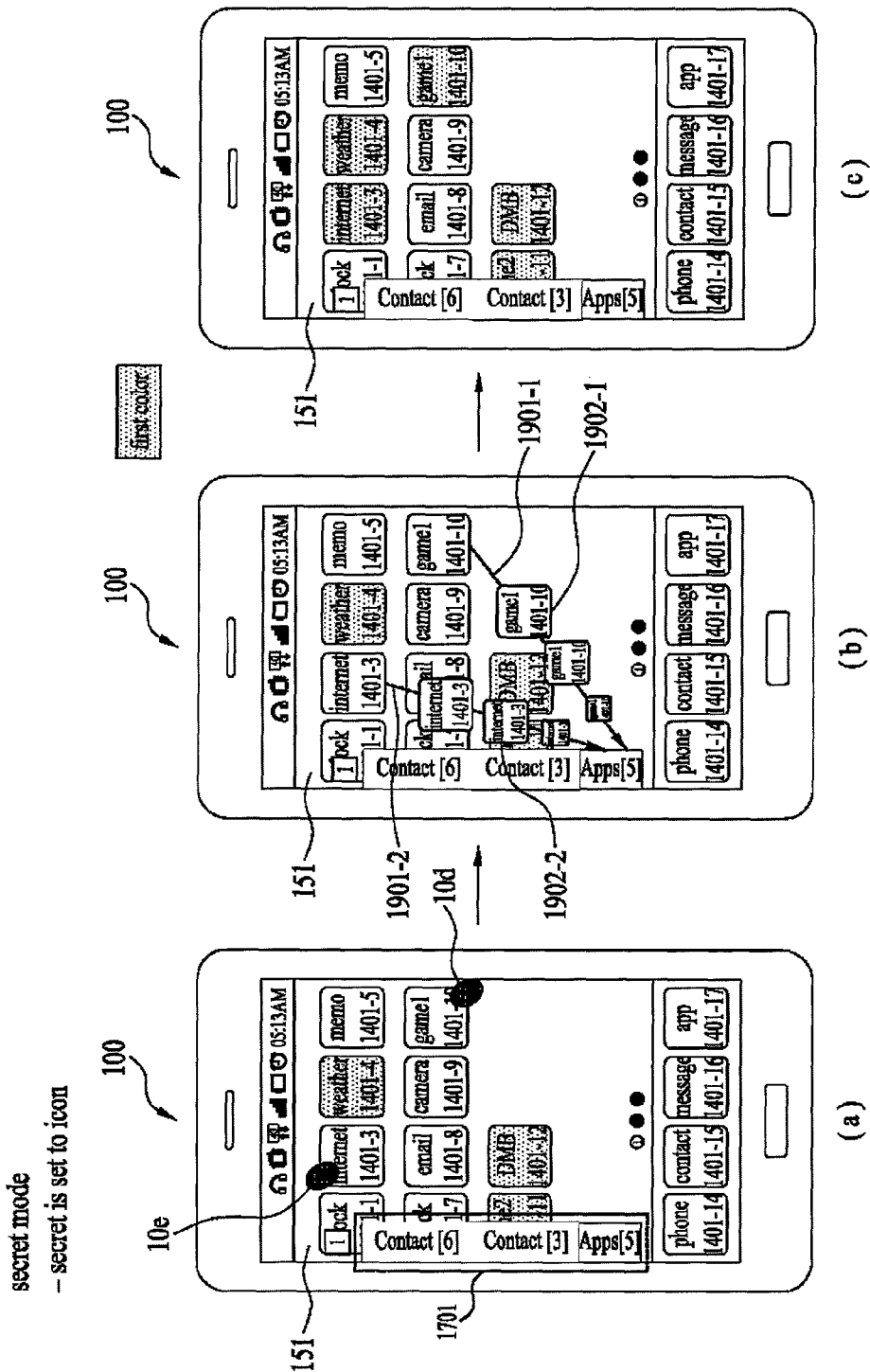
FIG. 19 is a diagram illustrating an example of a method of setting a secret to an execution icon in response to a prescribed fingerprint according to one embodiment of the present invention.

Next, FIG. 19 is a diagram illustrating an example of a method of setting a secret to an execution icon in response to a prescribed fingerprint according to one embodiment of the present invention. FIG. 19 (*a*) shows a state diagram of a first secret mode corresponding to a first fingerprint. The state diagram shows execution icons to which secret is not set together with execution icons 1401-4/1401-11/1401-12 to which secret is set in response to the first fingerprint.

If an input 10*e* or 10*d* for selecting a prescribed icon is received to set secret, the controller 180 can set secret to the selected execution icon. According to one embodiment of the present invention, the input for selecting the prescribed execution icon may correspond to an input touching a prescribed execution icon while a fingerprint recognition sensor is touching.

When the controller 180 performs a secret setting, the controller 180 can further display an animation effect showing that selected execution icons 1401-3/1401-10 are going into an "application" category according to a prescribed path 1901-1/1901-2 to inform a user that the secret setting is performed. The controller 180 can display an execution icon to which secret is set by a first color to identify the execution icon from a different execution icon.

Figure 20:
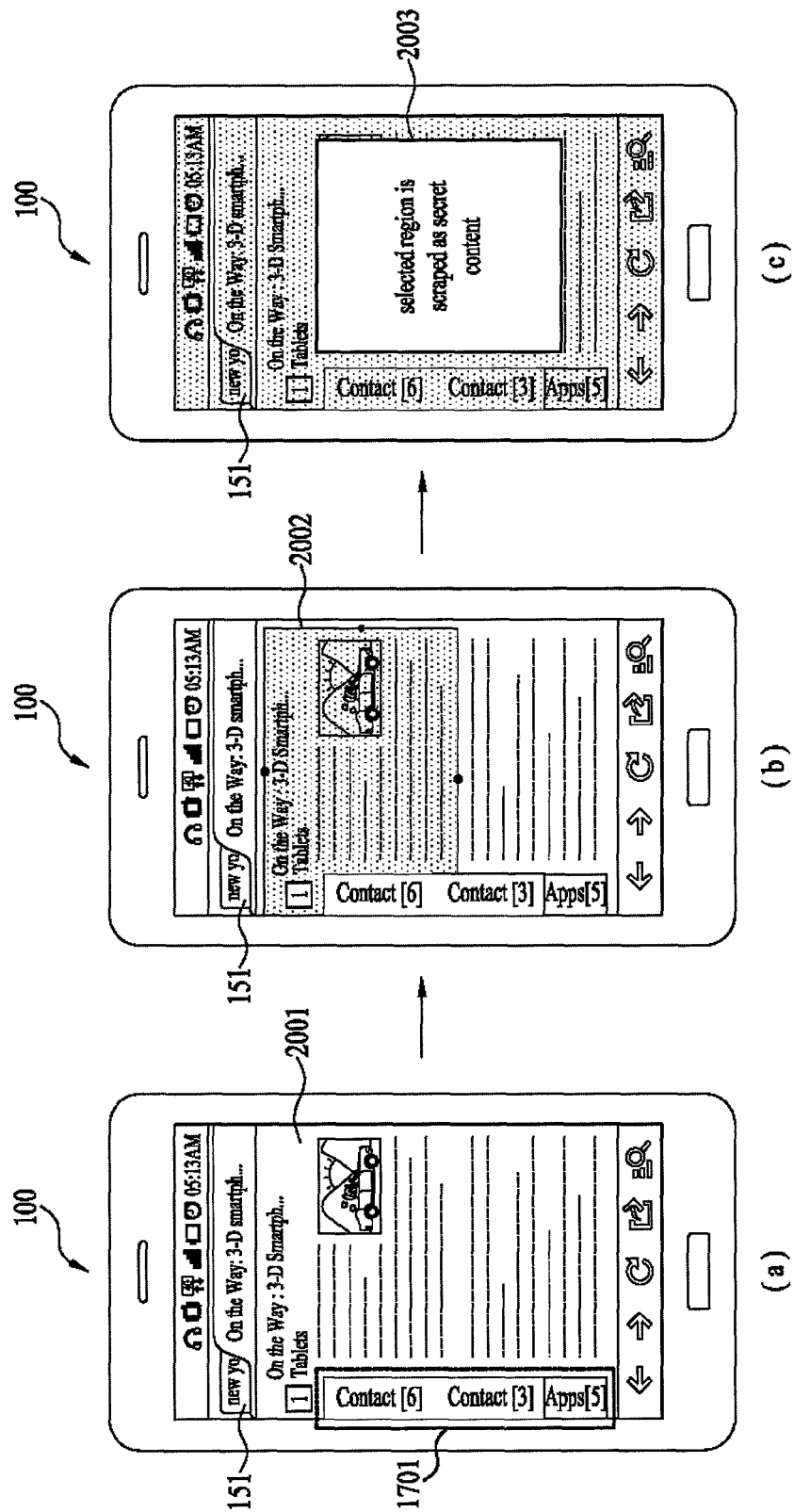
FIG. 20 is a diagram illustrating an example of a method of setting a secret to prescribed content in response to a prescribed fingerprint according to one embodiment of the present invention.

Next, FIG. 20 is a diagram illustrating an example of a method of setting a secret to prescribed content in response to a prescribed fingerprint according to one embodiment of the present invention. Referring to FIG. 20 (*a*), the controller 180 displays a news webpage 2001 via the display unit 151 using a prescribed a web browsing application while operating in a first secret mode and displays a categorizing menu 1701 in a part of the display unit 151.

If an input for selecting a prescribed region is received, the controller 180 can crop the selected prescribed region 2002 as a secret content. In this instance, the input for selecting the prescribed region 2002 may correspond to an input touching and dragging the prescribed region 2002 from one edge of the prescribed region to a diagonal edge of the prescribed region while a fingerprint input sensor is touching. In one embodiment of the present invention, the operation of cropping a region as a secret content indicates an operation of storing content by setting a secret to the content in response to the input fingerprint. If storing of the selected prescribed region 2002 is completed, the controller 180 can display a pop-up window 2003 to inform a user of the completion of the storing (refer to FIG. 20 (c)).

Figure 21:
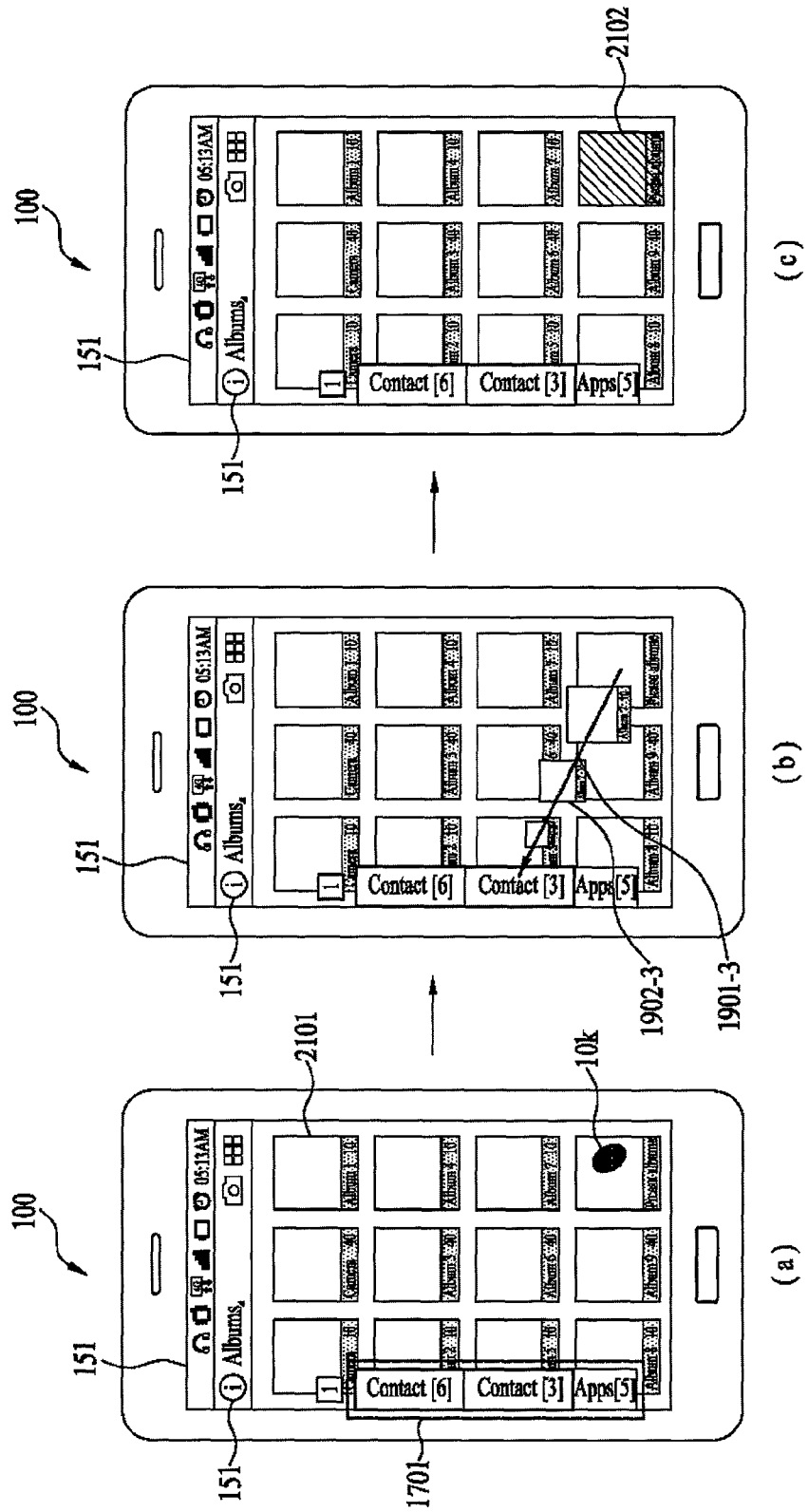
FIG. 21 is a diagram illustrating an example of setting a secret to a prescribed image data in response to a prescribed fingerprint in a gallery application according to one embodiment of the present invention.

FIG. 21 is a diagram illustrating an example of setting a secret to a prescribed image data in response to a prescribed fingerprint in a gallery application according to one embodiment of the present invention. FIG. 21 (a) shows a state diagram illustrating a gallery application of a first secret mode corresponding to a first fingerprint. Image folder thumbnails 2101 to which secret is not set are displayed in the state diagram.

If an input 10k for selecting a prescribed image folder thumbnail is received to set a secret, the controller 180 can set the secret to the selected image folder thumbnail. According to one embodiment of the present invention, the input for selecting the prescribed image folder thumbnail may correspond to an input touching the prescribed image folder thumbnail while a fingerprint recognition sensor is touched.

When setting the secret, the controller 180 can further display an animation effect 1902-3 showing that the selected image folder thumbnail is going into a "content" category according to a prescribed path 1901-3 to inform a user that the secret is set. The controller 180 can display the image folder thumbnail to which the secret is set by a prescribed color 2102 to identify the image folder thumbnail from a different image folder thumbnail. So far, the method of setting a secret to a prescribed object in response to a prescribed fingerprint is explained. Moreover, one embodiment of the present invention further provides a method of setting a secret to a plurality of objects easier than the aforementioned method. This embodiment is described with reference to FIG. 22.

Figure 22:
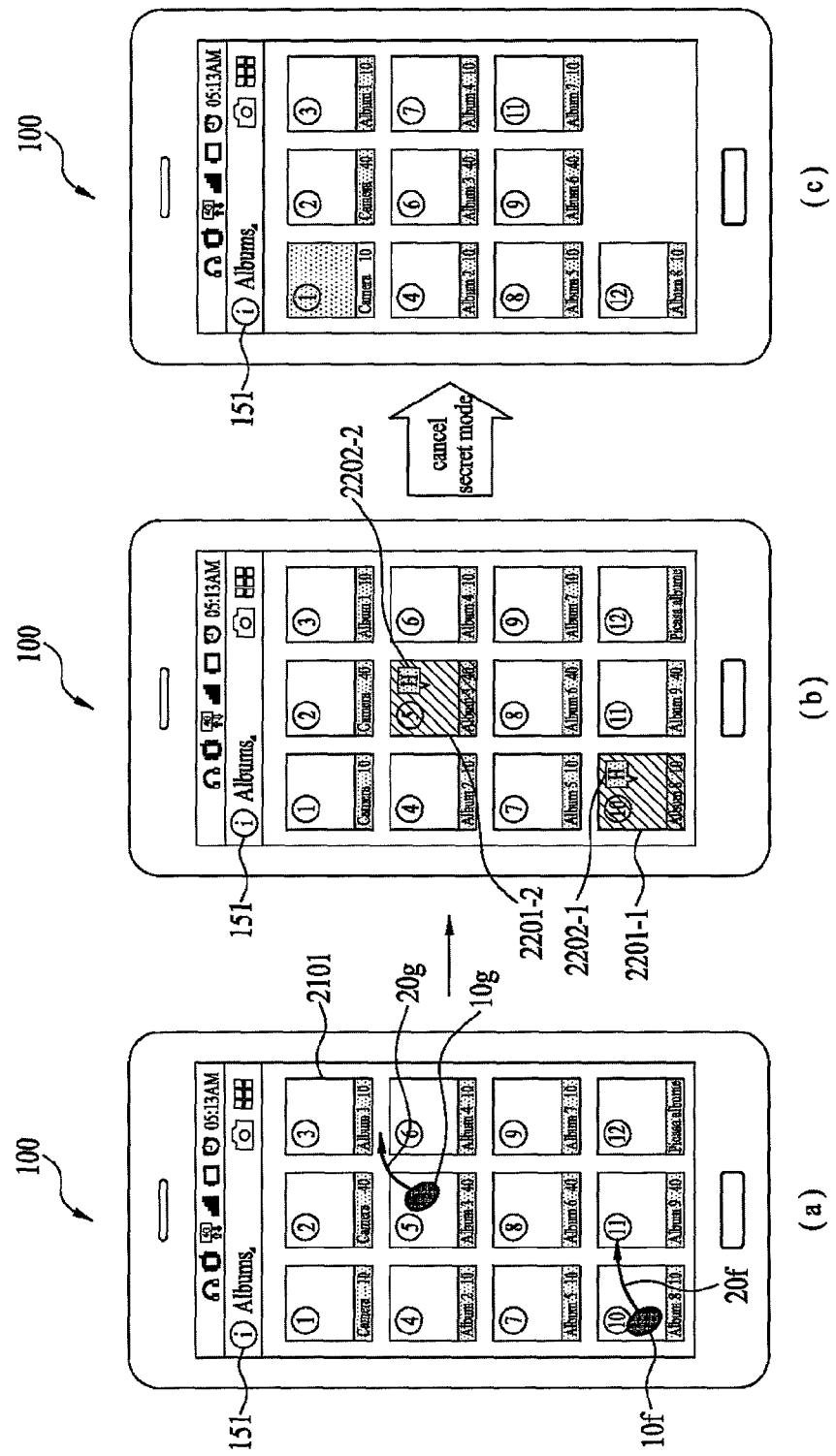
FIG. 22 is a diagram illustrating a method of controlling a secret to be easily set to a prescribed image object according to one embodiment of the present invention.

In particular, FIG. 22 is a diagram illustrating a method of controlling a secret to be easily set to a prescribed image object according to one embodiment of the present invention. FIG. 22 (a) shows an execution state diagram of a gallery application in a first secret mode. According to the execution state diagram, the controller 180 displays a plurality of image folder thumbnails 2101. For clarity, the image folder thumbnails displayed as a #1 to #12 in FIG. 22 are called a folder 2101-1 to a folder 2101-12.

If prescribed gestures (10g, 20g, 10f and 20f) for selecting prescribed image folder thumbnails 2101-5/2101-10 are input to set a secret, the controller 180 can set the secret to the selected prescribed image folder thumbnails 2101-5/2101-10. The controller 180 can display a prescribed indicator 2201-1/2202-1 to identify the prescribed image folder thumbnails 2101-5/2101-10 to which the secret is set from a different image folder thumbnail. If a command for cancelling a secret mode is received, the controller 180 can control the image folder thumbnail 2101-5/2101-10 not to be displayed anymore (refer to FIG. 22 (c)).

Figure 23:
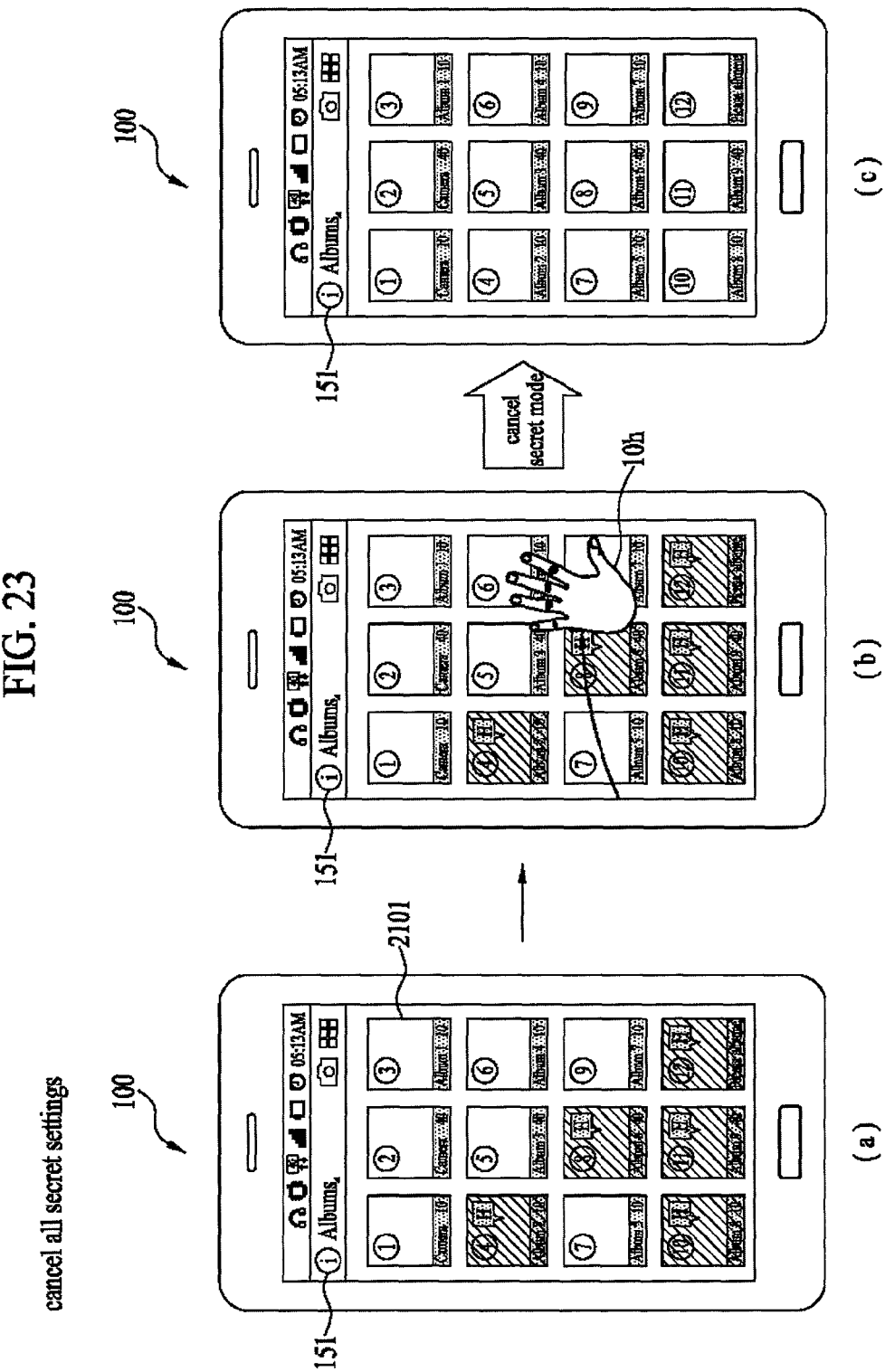
FIG. 23 is a diagram illustrating a controlling method cancelling a secret setting of a plurality of image folder thumbnails all at once according to one embodiment of the present invention.

FIG. 23 is a diagram illustrating a controlling method cancelling a secret setting of a plurality of image folder thumbnails all at once according to one embodiment of the present invention. FIG. 23 (a) shows an execution state diagram of a gallery application in a first secret mode. According to the state diagram, the controller 180 displays a plurality of image folder thumbnails 2101 and it is assumed that a secret is set to a part (2101-4, 2101-8, 2101-10, 2101-11 and 2101-12) of a plurality of the image folder thumbnails.

If a command 10h for cancelling the secret setting all at once is received, the controller 180 controls the secret setting set to the part (2101-4, 2101-8, 2101-10, 2101-11 and 2101-12) of a plurality of the image folder thumbnails to be cancelled (refer to FIG. 23 (c)).

According to one embodiment of the present invention, the command 10h for cancelling the secret setting all at once may correspond to an input touching a screen by three or more fingers or dragging the screen from a left to a right direction while touching a fingerprint recognition sensor. According to one embodiment of the present invention, if an input for dragging the screen from the right to the left direction is received again in a state of FIG. 23 (c), the controller 180 can control the cancelled secret setting to be restored again.

One embodiment of the present invention displays a part of image folder thumbnails only among a plurality of image folder thumbnails 2101 displayed in a gallery application by filtering a plurality of the image folder thumbnails. This embodiment is described with reference to FIG. 24.

Figure 24:
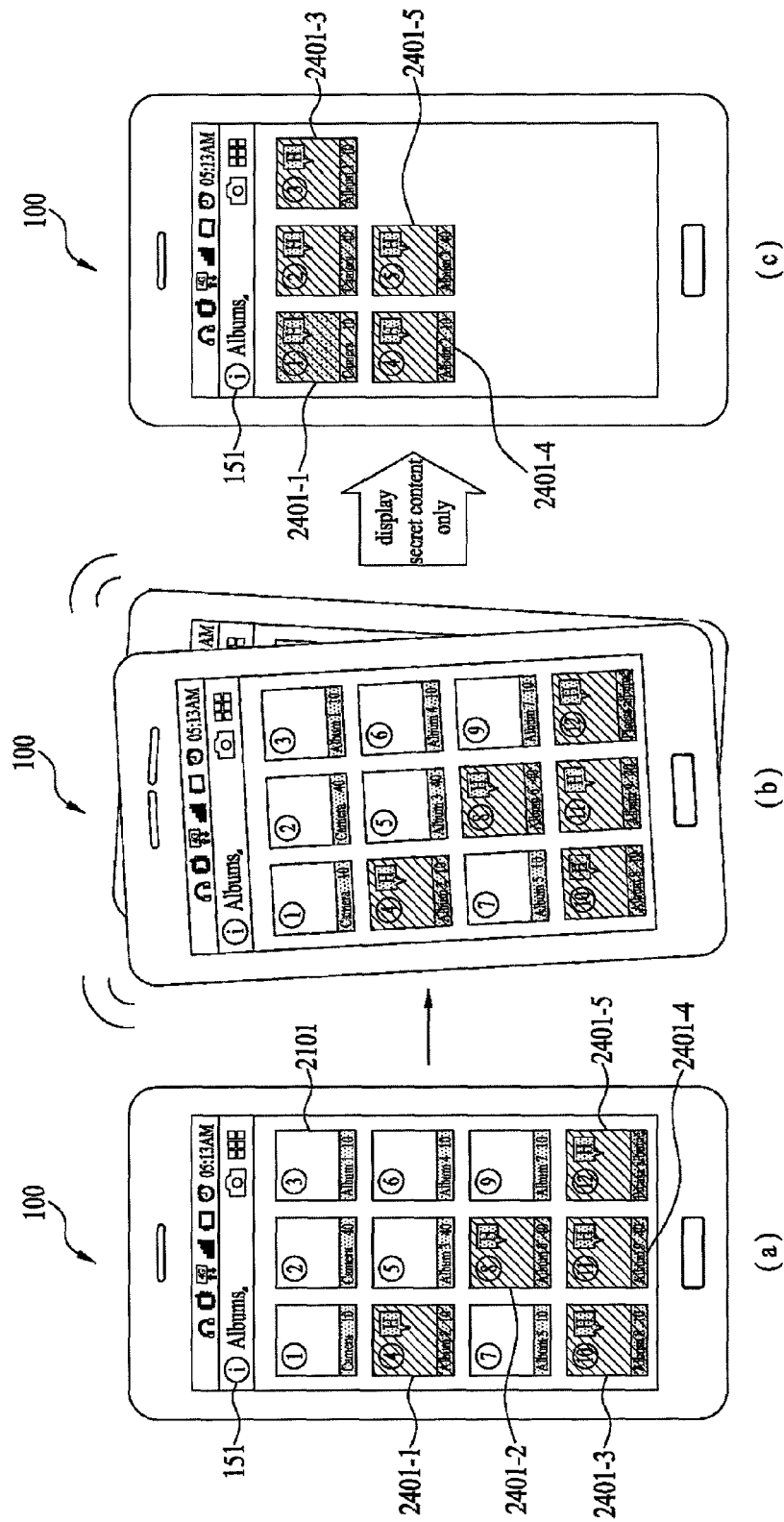
FIG. 24 is a diagram illustrating a control method providing contents to which a secret is set by filtering the contents according to one embodiment of the present invention.

In particular, FIG. 24 is a diagram illustrating a control method providing contents to which a secret is set by filtering the contents according to one embodiment of the present invention. FIG. 24 (a) shows an execution state diagram of a gallery application in a first secret mode. According to the state diagram, the controller 180 displays a plurality of image folder thumbnails 2101 and it is assumed that a secret is set to a part (2401-1 to 2401-5) of a plurality of the image folder thumbnails.

If a command for filtering a plurality of the displayed image folder thumbnails 2101 to display a part of secret-set image folder thumbnails 2401-1 to 2401-5 only is received, the controller 180 can control the display unit 151 to display a part of the secret-set image folder thumbnails 2401-1 to 2401-5 only (refer to FIG. 24 (c)). In one embodiment of the present invention, the command for filtering a plurality of the displayed image folder thumbnails 2101 to display a part of secret-set image folder thumbnails 2401-1 to 2401-5 only may correspond to an input shaking the mobile terminal from side to side after a fingerprint recognition sensor is touched.

Moreover, if a command for returning to an original display is received, the controller 180 can control a state of FIG. 24 (a) to be displayed again instead of a state of FIG. 24 (c). According to one embodiment, similar to the command for filtering a plurality of the displayed image folder thumbnails, the command for returning to the original display may correspond to an input shaking the mobile terminal from side to side after the fingerprint input sensor is touched.

Figure 25:
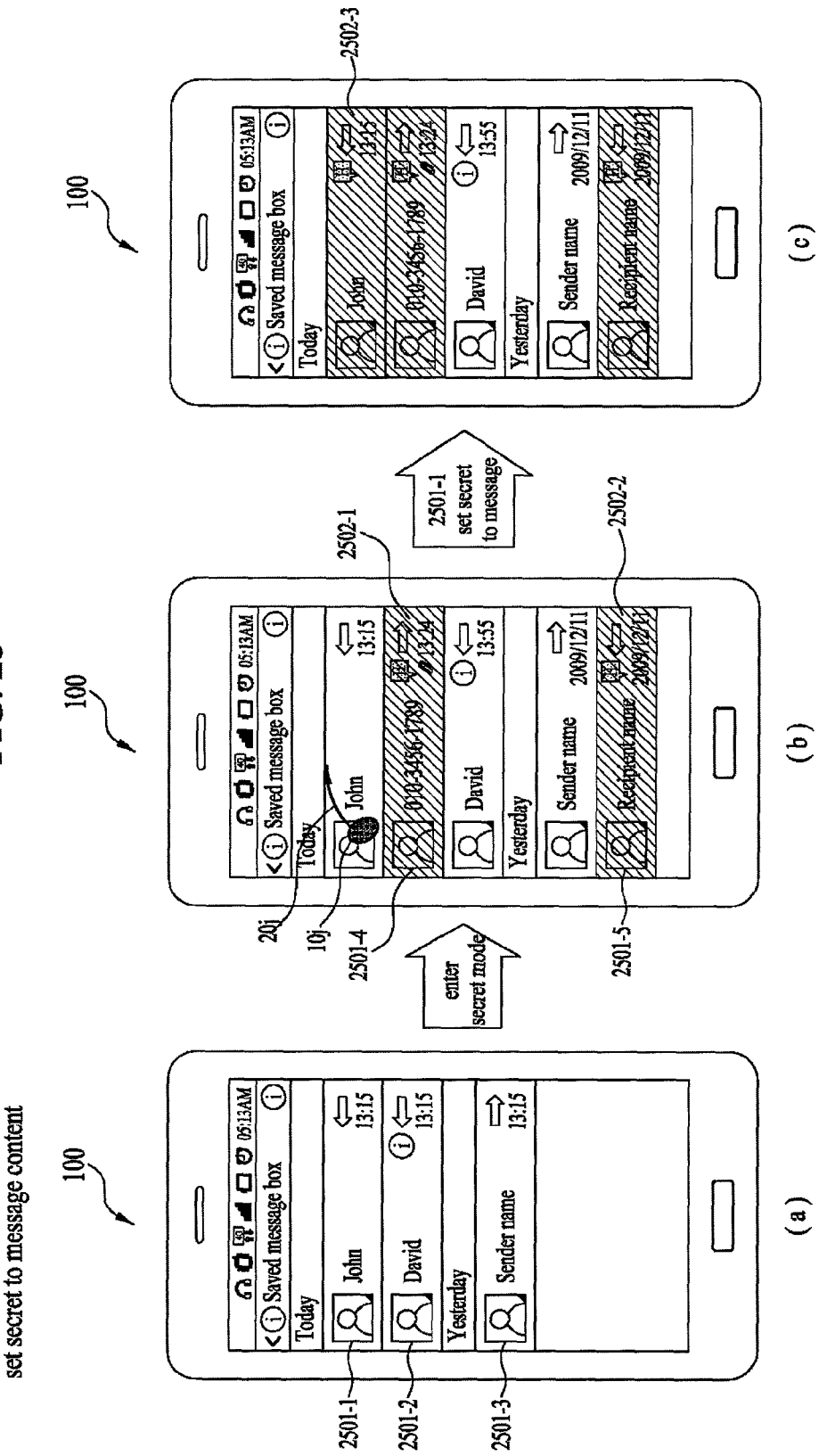
FIG. 25 is a diagram illustrating a method of controlling a secret to be set to a message content in response to a prescribed fingerprint according to one embodiment of the present invention.

FIG. 25 is a diagram illustrating a method of controlling a secret to be set to a message content in response to a prescribed fingerprint according to one embodiment of the present invention. FIG. 25 (a) shows a state diagram of a saved message box while the controller 180 is executing a message application. The state diagram shows saved message contents 2501-1 to 2501-3.

In this state, if a command for entering a secret mode is received, the controller 180 can further display a message content(s) 2501-4 and 2501-5 to which a secret is set. According to one embodiment of the present invention, indicators 2502-1 and 2502-2 can be further displayed to identify the message content(s) to which the secret is set from a different message content.

If an input 10*j* and 20*j* for selecting a prescribed message content (a message content 2501-1 shown in an example of FIG. 25 (*b*)) is received to set a secret, the controller 180 can set the secret to the selected prescribed message content 2501-1 (refer to FIG. 25 (*c*)). In addition, the controller can control an indicator 2502-3 to be further displayed for the message content 2501-1 to which the secret is set.

Figure 26:
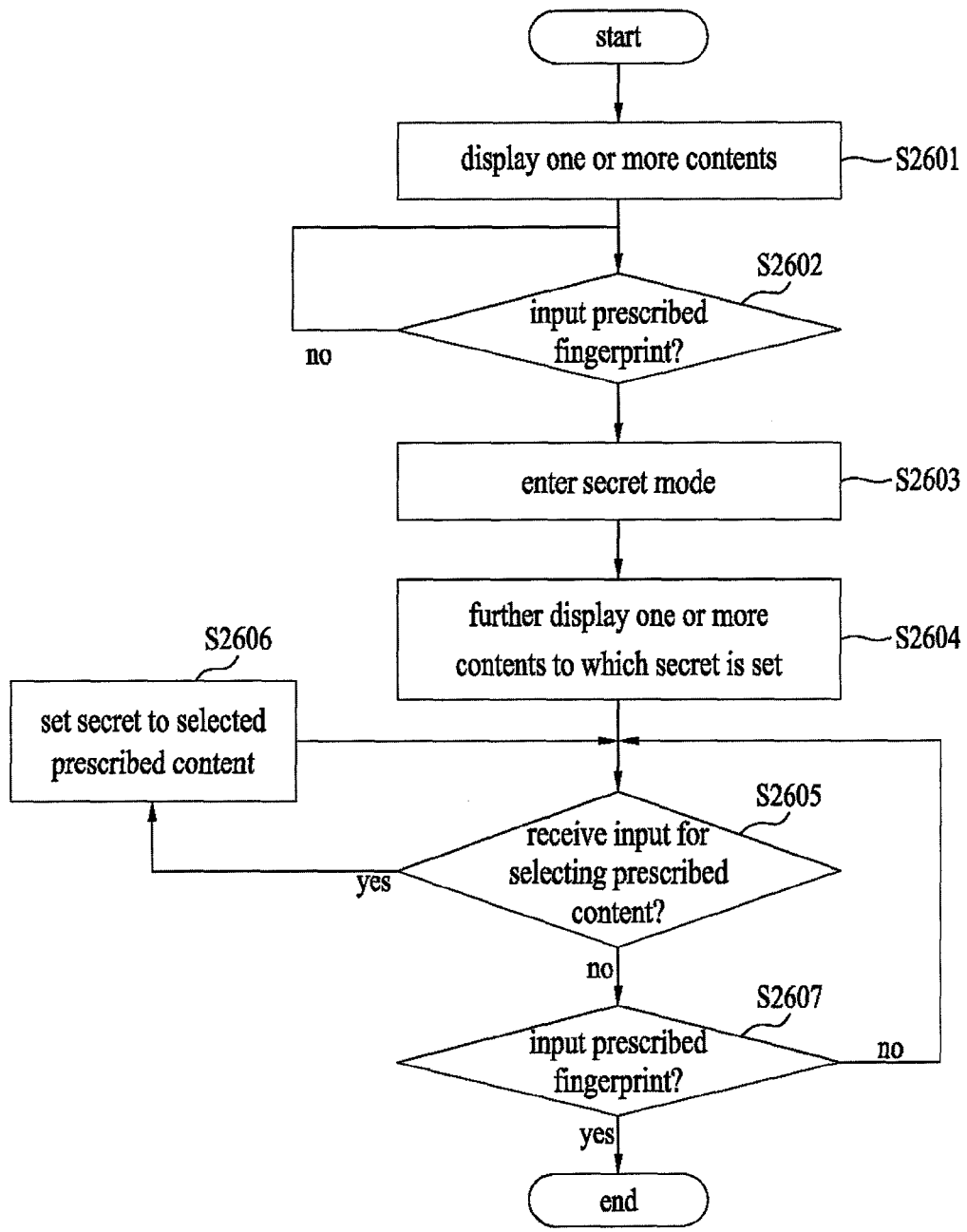
FIG. 26 is a flowchart illustrating a method of displaying a secret-set content according to one embodiment of the present invention.

FIG. 26 is a flowchart illustrating a method of displaying a secret-set content according to one embodiment of the present invention. In the step S2601, the controller 180 displays at least one content. In this instance, the content can include at least one of a transmitted/received text message content, a webpage content and an application execution icon.

In the step S2602, the controller 180 waits for an input of a prescribed fingerprint input via a fingerprint input sensor. If the prescribed fingerprint is not input (No in S2602), the controller 180 repeats the step S2602. If the prescribed input is input (Yes in S2602), the controller 180 can proceed to the step S2603. In the step S2603, the controller 180 can enter a secret mode. In this instance, since the secret mode is identical to what is mentioned earlier, the detailed explanation on the secret mode is omitted.

In the step S2604, the controller 180 can display at least one content to which a secret is set. In the step S2605, according to whether an input for selecting a prescribed content is received or not, if the input for selecting the prescribed content is received (Yes in S2605), the controller 180 proceeds to the step S2606. If the input for selecting the prescribed content is not received (No in S2605), the controller 180 proceeds to the step S2607.

In the step S2607, the controller 180 waits for an input of a prescribed fingerprint input via the fingerprint input sensor. If the prescribed fingerprint is not input (No in S2607), the controller 180 returns to the step S2605. If the prescribed fingerprint is input (Yes in S2607), the method ends. As mentioned in the foregoing description, a fingerprint of a person can be identified by a left hand, a right hand and even each finger of the same person. Hence, a different embodiment of the present invention operates in a different mode (in particular, a picture capturing mode) according to a finger of a left/right hand of a user.

Figure 27:
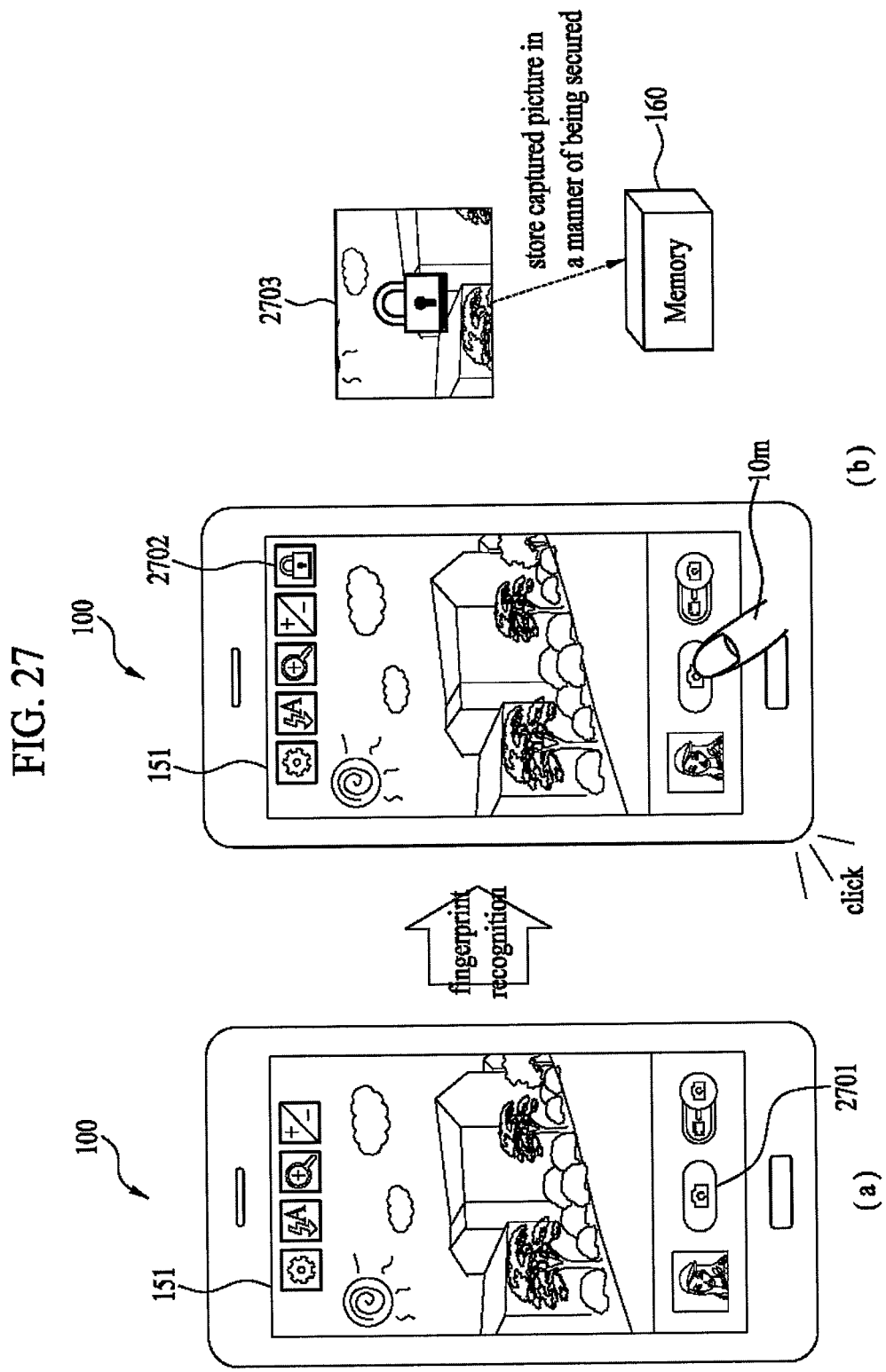
FIG. 27 is a diagram illustrating an example of a method of automatically setting security to a captured image according to one embodiment of the present invention.
Figure 28:
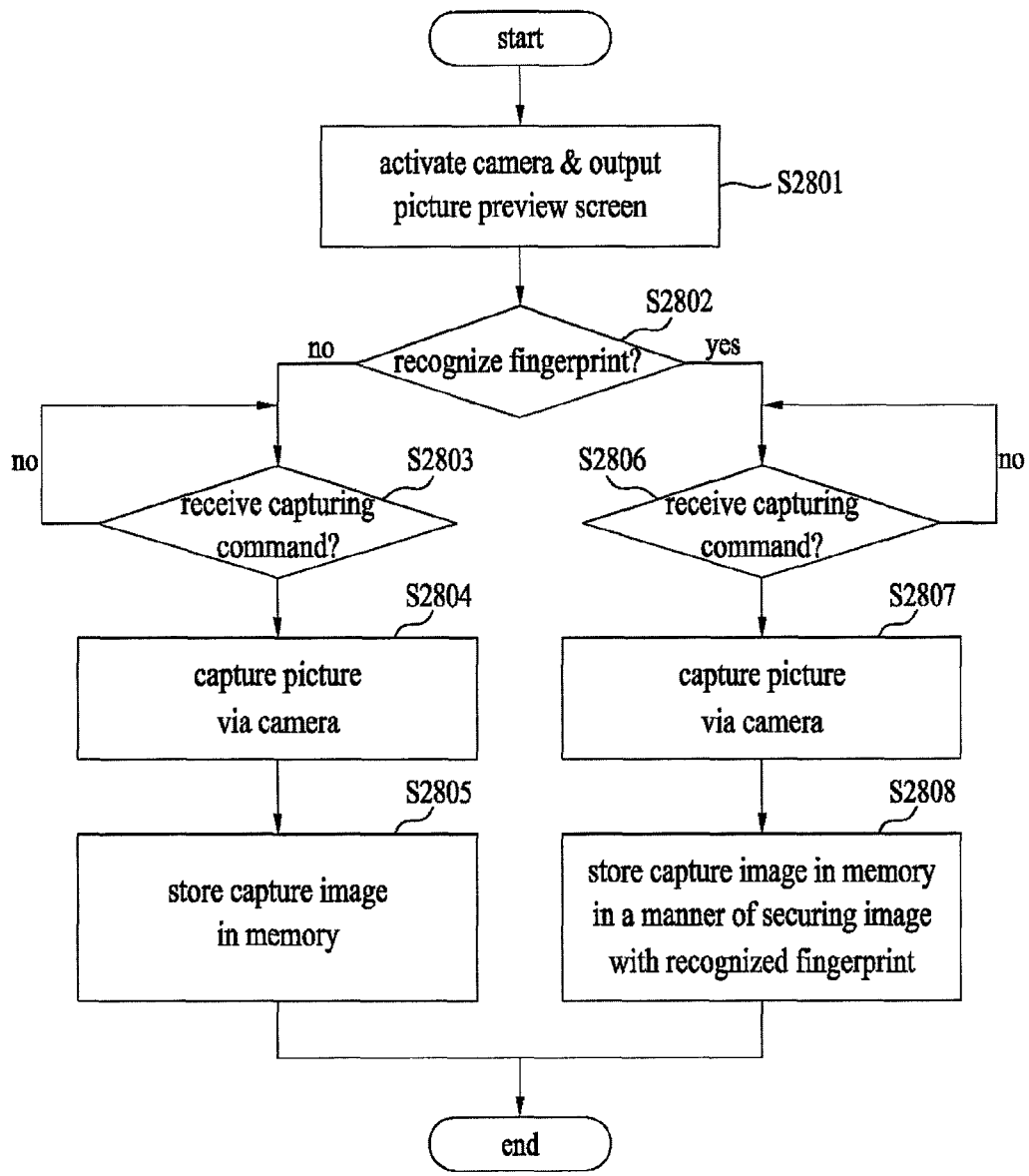
FIG. 28 is a flowchart illustrating a method of automatically setting security to a captured image according to one embodiment of the present invention.

In particular, FIG. 27 is a diagram and FIG. 28 is a flowchart illustrating a method of automatically setting security to a captured image according to one embodiment of the present invention. Referring to FIG. 27 (*a*), the controller 180 activates a camera 121 and can display a preview screen of the activated camera 121 on the display unit 151 (S2801 of FIG. 28). As shown in FIG. 27 (*a*), a shutter key configured to take a picture via the camera 121 can be implemented by a virtual shutter button 2701 (hereinafter called a shutter button) displayed on a touchscreen or a hardware button installed in the exterior of the mobile terminal 100.

In a state shown in FIG. 27 (*a*), if an input for selecting the shutter button 2701 is received (S2803), the controller 180 takes a picture via the camera 121 (S2804) and can store an image data for the picture taken in the memory 160 (S2805). In addition, the stored image data can be read via a gallery application (or a function of checking a captured image of a capturing application).

The image data stored by the aforementioned method corresponds to an image data to which no security is set. In this instance, no security indicates a state that the image data can be read by all users who use the corresponding mobile terminal 100. In particular, the state indicates that everybody can read the image data when executing the gallery application of the mobile terminal 100.

Because the image data is highly related to privacy of a specific individual, it is preferable to increase the security of the image data. Hence, one embodiment of the present invention provides a controlling method for easily setting security to the image data. In particular, one embodiment of the present invention provides divides a mode into a normal capturing mode and a security capturing mode and automatically set a security when storing a picture captured in the security capturing mode. A picture captured in the normal capturing mode indicates a picture captured in a capturing mode identical to a legacy capturing mode.

When the camera 121 is activated, if a prescribed fingerprint is recognized via a fingerprint recognition sensor (S802), when storing a captured picture, the controller 180 stores the captured picture by setting security to the captured image with the recognized prescribed fingerprint (security capturing mode). An operation of setting security with a prescribed fingerprint according to one embodiment of the present invention indicates that the prescribed fingerprint is required to read the securely stored picture. In particular, the corresponding picture can be read only when the prescribed fingerprint is recognized.

FIG. 27 (*b*) is a diagram showing a state that a prescribed fingerprint is recognized when the camera 121 is activated. The controller 180 can display a security indicator 2702 indicating that a captured image is stored by being secured and a picture preview screen together. In a state shown in FIG. 27 (*b*), if a picture capturing command 10*m* is received, the controller 180 captures a picture (S2807) and can store the captured picture in the memory 160 by setting security to the captured picture (S2808). In this instance, when setting the security to the captured picture, the security can be set based on the prescribed fingerprint. For instance, the secured picture can be set to be read by the prescribed fingerprint only. Regarding a method of reading the secured picture is described later with reference to FIGS. 29 and 30.

Meanwhile, in the embodiment explained with reference to FIG. 27, capturing a picture after a fingerprint is recognized on a camera preview screen is explained as an example. Yet, an order between recognizing a fingerprint and capturing a picture may be non-limited. In particular, although a fingerprint is recognized after a picture is captured, the embodiment of FIG. 27 can be identically applied. In particular, as shown in embodiment of FIG. 27 (*a*), although a prescribed fingerprint is detected after the camera is activated and a picture is captured, the controller 180 can apply a security function to the captured picture. Embodiment to be explained in the following may also be non-limited to the order between recognizing a fingerprint and capturing a picture.

Figure 29:
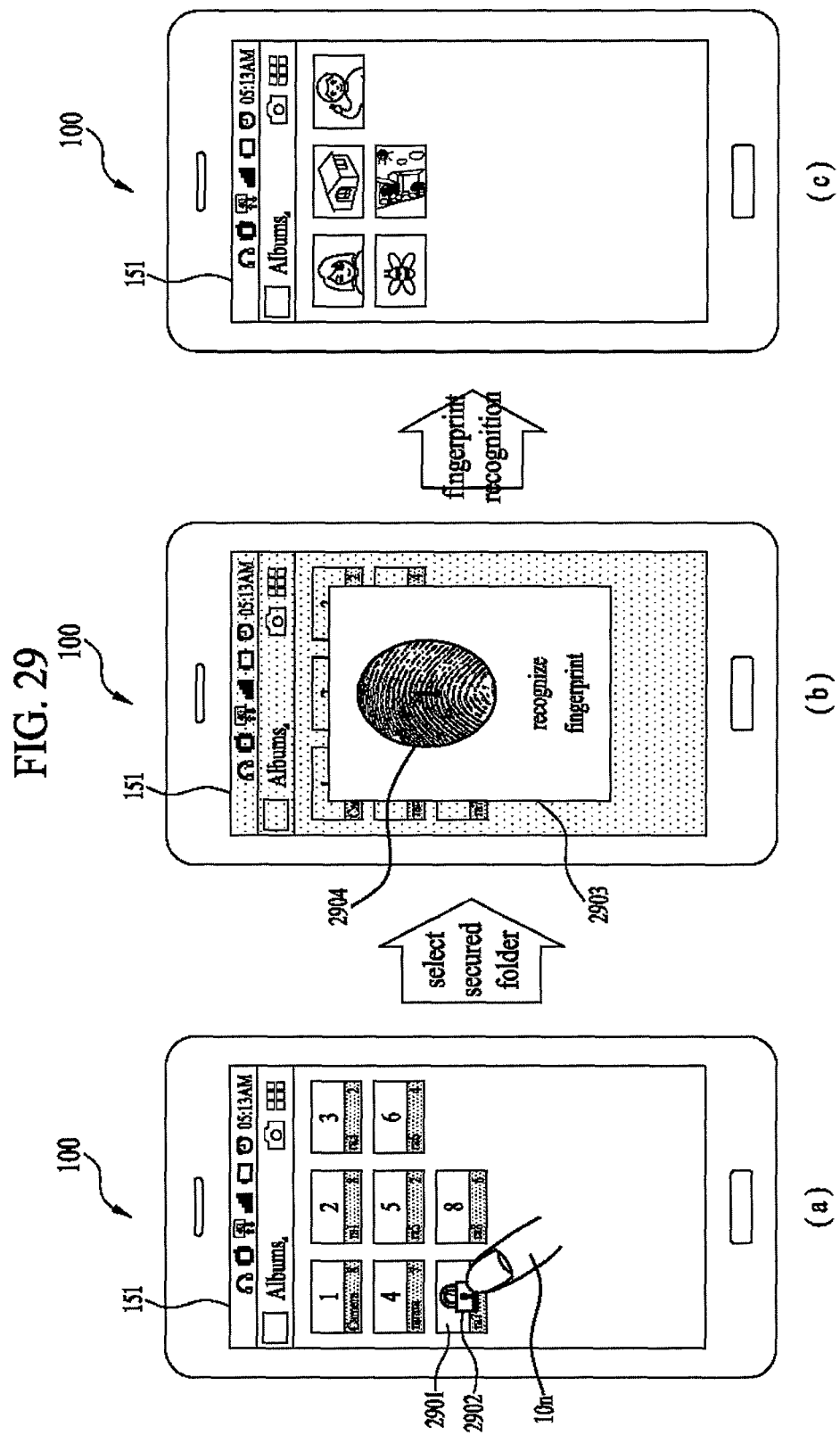
FIG. 29 is a diagram illustrating a method of reading a secured picture according to one embodiment of the present invention.
Figure 30:
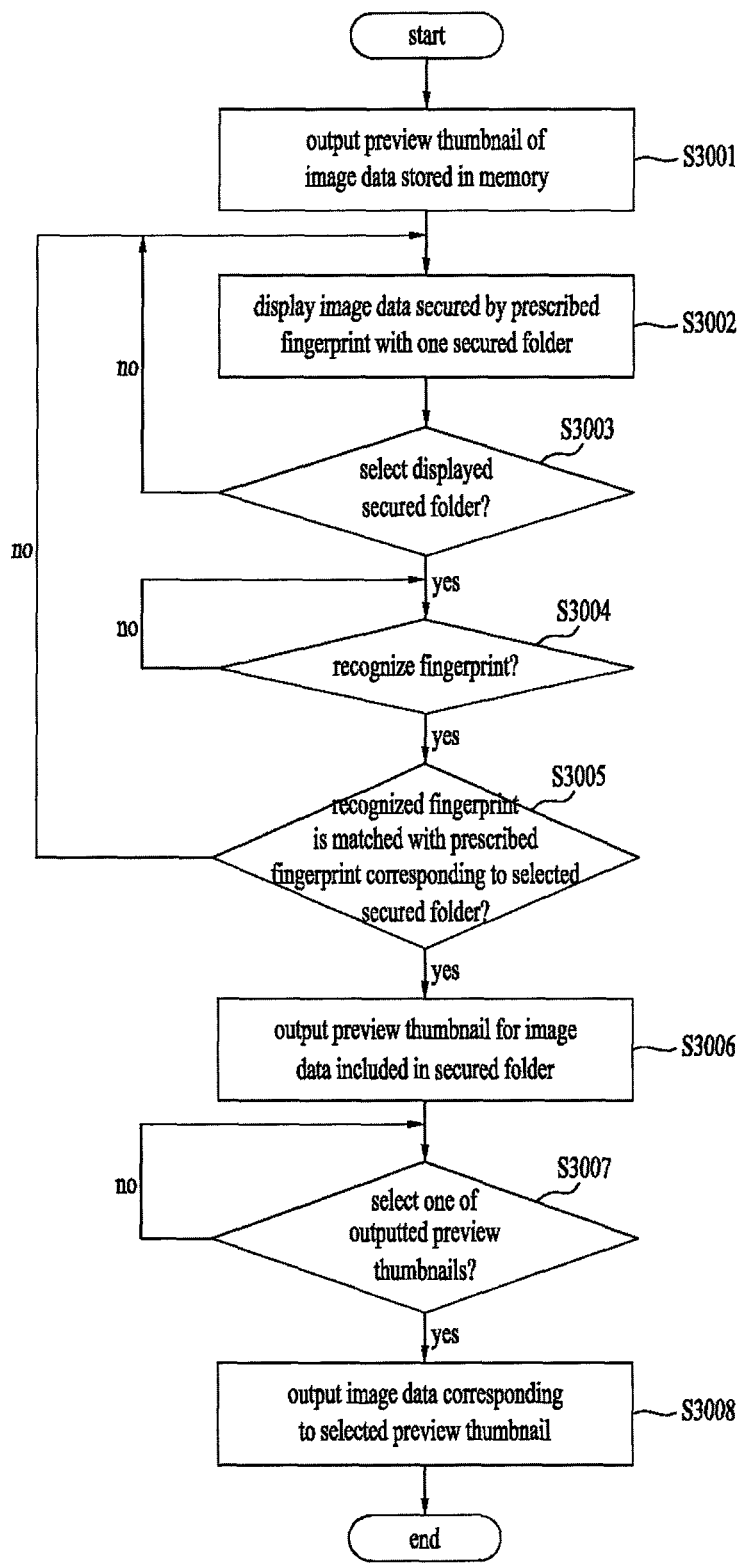
FIG. 30 is a flowchart illustrating a method of reading a secured picture according to one embodiment of the present invention.

FIG. 29 is a diagram and FIG. 30 is a flowchart illustrating a method of reading a secured picture according to one embodiment of the present invention. The following description is explained with reference to FIGS. 29 and 30 together. In the step S3001, if a gallery application (or, an application capable of reading image data) is executed, the controller 180 outputs preview thumbnails (or a list of image data) for one or more image data stored in the memory 160 (refer to FIG. 29 (*a*)). As shown in FIG. 29 (*a*), one embodiment of the present invention displays image data for captured pictures secured by a prescribed fingerprint in a folder 2901 (hereinafter called a secured folder) (S3002). The controller 180 can further display a security indicator 2902, which indicates that the image data corresponds to secured data, on the displayed secured folder 2901.

As shown in FIG. 29 (b), if an input 10n for selecting the secured folder 2901 is received, the controller 180 displays a pop-up window 2903 requesting a user to recognize a fingerprint on the display unit 151 and may be then able to wait for fingerprint recognition. If the fingerprint 2904 is recognized, the controller 180 determines whether the recognized fingerprint is matched with a prescribed fingerprint (i.e., the prescribed fingerprint input when entering the secured capturing mode) corresponding to the selected secured folder (S2005).

If it is matched with each other, the controller 180 can proceed to the step S3006. In particular, as shown in FIG. 29 (c), if it is determined that the recognized fingerprint is matched with the prescribed fingerprint, the controller 180 can provide preview thumbnails of contents (image data) included in the secured folder 2901 to the user (S3006). If it is determined that the recognized fingerprint is not matched with the prescribed fingerprint, the controller 180 displays the pop-up window 2903 requesting the user to recognize a fingerprint on the display unit 151 again and may be then able to wait for fingerprint recognition.

Moreover, according to one embodiment of the present invention, the user can enter the secured capturing mode for each of a plurality of fingers of the user. One embodiment of the present invention provides to generate a secured folder for each of a plurality of the fingers of the user. The aforementioned embodiments can be identically applied to each of the secured capturing mode and the secured folder. In addition, if one of the output preview thumbnails is selected (S3007), the controller 180 can control an image data corresponding to the selected preview thumbnail to be displayed (S3008).

As shown in FIG. 29 (c), in a state capable of reading image data since security is cancelled, the security can be set again. If a prescribed fingerprint is recognized again in the state shown in FIG. 29 (c), the controller 180 sets security to the corresponding folder again. A different embodiment of the present invention provides that a fingerprint input is requested to a user when the user enters a reading screen of the corresponding folder only. If the user has already entered the reading screen of the corresponding folder, the different embodiment of the present invention provides to cancel the security setting until the user leaves the reading screen of the corresponding folder or until an application is terminated.

So far, a method of setting security to a picture captured in a secured capturing mode and a method of reading image data to which security is set have been explained. A different embodiment of the present invention provides a method of arranging/filtering image data using a fingerprint sensor. This embodiment is described with reference to FIGS. 31 and 32.

Figure 31:
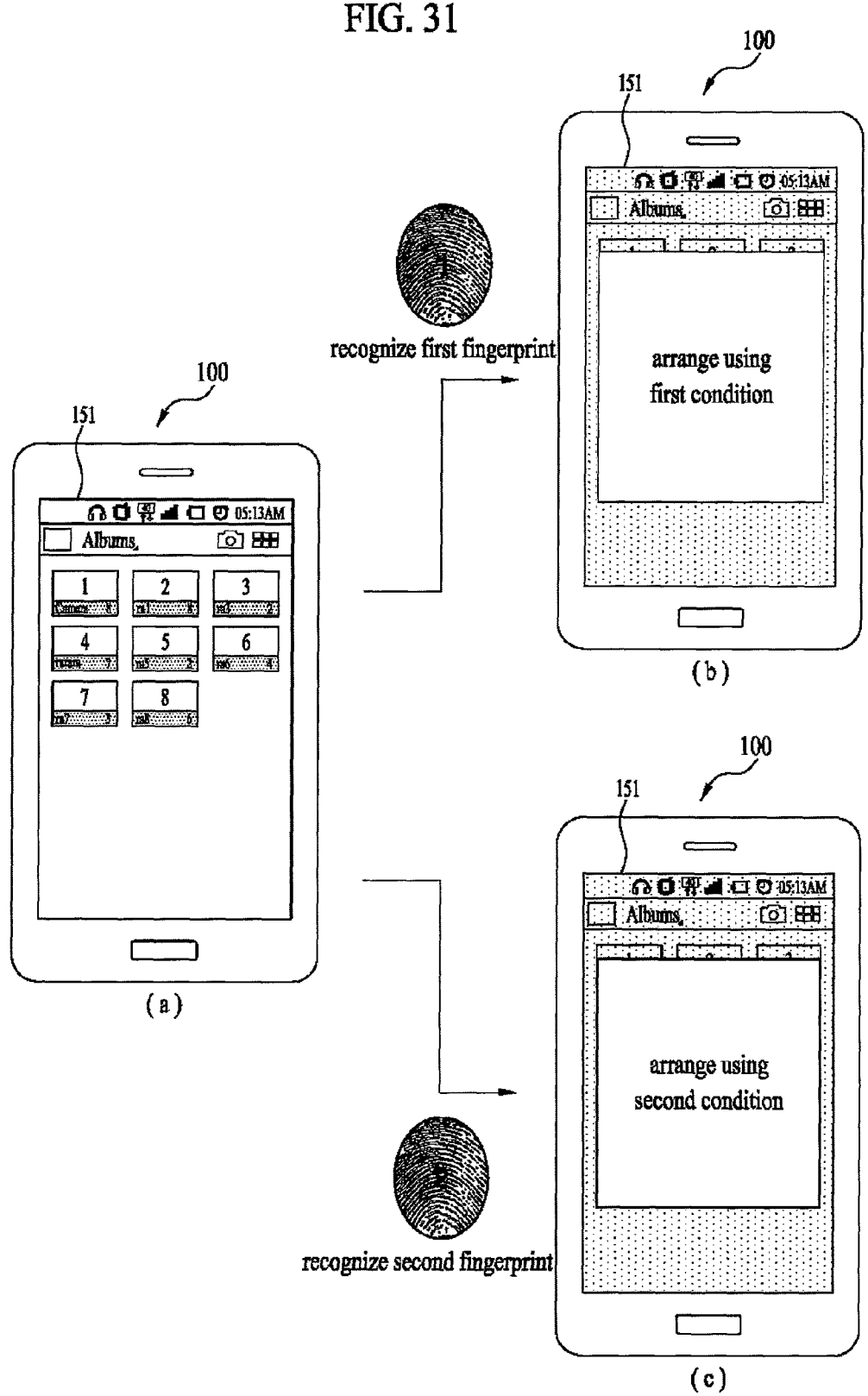
FIG. 31 is a diagram illustrating a method of arranging the displayed preview thumbnails with an arrangement condition corresponding to the prescribed fingerprint according to one embodiment of the present invention.

When a prescribed fingerprint is recognized while preview thumbnails of image data are displayed, FIG. 31 is a diagram illustrating a method of arranging the displayed preview thumbnails with an arrangement condition corresponding to the prescribed fingerprint according to one embodiment of the present invention. As shown in FIG. 31 (a), the controller 180 can display preview thumbnails for one or more image data using a prescribed application.

In this instance, the preview thumbnails can include not only a preview thumbnail for a single image but also a preview thumbnail for a folder, which displays a plurality of image data as a group. In this instance, if a prescribed fingerprint is recognized via a fingerprint recognition sensor, the controller 180 can arrange the displayed preview thumbnails using an arrangement condition corresponding to the prescribed fingerprint.

In particular, if a first fingerprint is recognized, the controller 180 can arrange the preview thumbnails using a first condition (refer to FIG. 31 (b)). If a second fingerprint is recognized, the controller 180 can arrange the preview thumbnails using a second condition (refer to FIG. 31 (c)). The arrangement condition can include at least one of an order of capturing date, a Korean alphabet order, an alphabet order and an order of frequently read.

Figure 32:
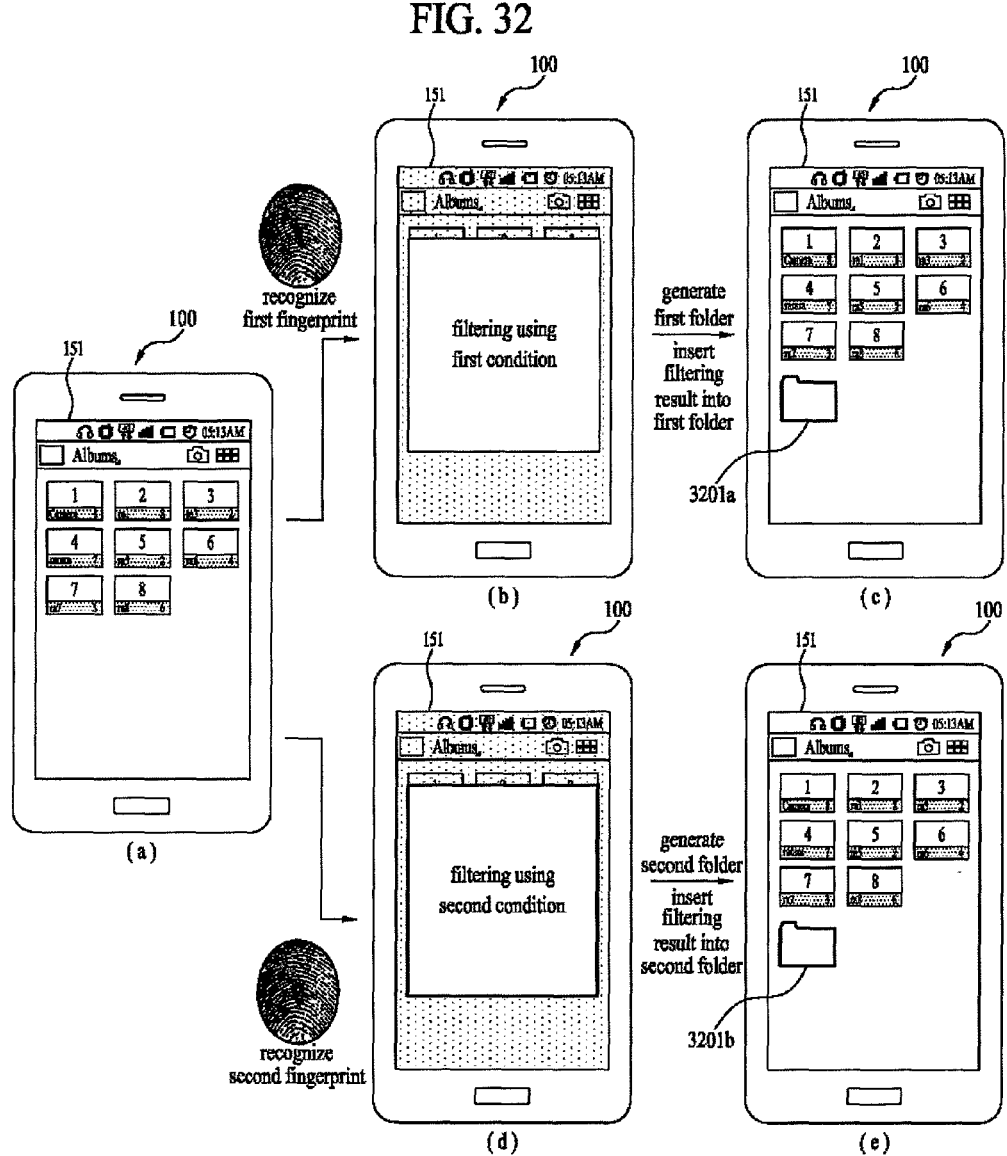
FIG. 32 is a diagram illustrating a method of filtering the displayed preview thumbnails with a filtering condition corresponding to the prescribed fingerprint according to one embodiment of the present invention.

When a prescribed fingerprint is recognized while preview thumbnails of image data are displayed, FIG. 32 is a diagram illustrating a method of filtering the displayed preview thumbnails with a filtering condition corresponding to the prescribed fingerprint according to one embodiment of the present invention. As shown in FIG. 32 (a), the controller 180 can display preview thumbnails for one or more image data using a prescribed application. If a prescribed fingerprint is recognized using a fingerprint recognition sensor in a state shown in FIG. 32 (a), the controller 180 filters (FIG. 32 (b) and FIG. 32 (d)) the displayed preview thumbnails using a filtering condition corresponding to the prescribed fingerprint and can generate a filtering result folder 3201a/3201b including a filtering result. In this instance, the filtering condition can include at least one of a prescribed tag search word, an image data form and a face recognition result for a prescribed person.

For instance, if a first filtering condition corresponding to a first fingerprint recognition corresponds to such a tag search word as 'Brad Pitt', the controller 180 searches for image data in which a tag of 'Brad Pitt' is designated among image data stored in the memory 160 in response to the first fingerprint recognition and may be then able to generate a first filtering result folder 3201a including at least one searched image data.

Similar to the first fingerprint recognition, if a second fingerprint is recognized, filtering is performed based on a second filtering condition and may be then able to generate a second filtering result folder 3201b. Moreover, according to one embodiment of the present invention, the controller 180 recognizes not only a tag search word but also a face of a person included in image data and can further search for an image data identical to a face recognition of such a person as 'Brad Pitt' according to a face recognition result.

Also, according to a different embodiment of the present invention, the controller 180 can store the face recognition result for the image data together with a tag tagging the face recognition result. In particular, if the face recognition result included in the image data includes a face of a prescribed person (e.g., such a person as 'Brad Pitt'), the controller 180 can store a name of the prescribed person and/or the face recognition result (e.g., 'Brad Pitt') in the image data as tag information by matching the name of the prescribed person and/or the face recognition result with the tag information. By doing so, the controller 180 can search for a person included in the image data by simply performing an operation of searching for a tag for a specific person.

In addition, one embodiment of the present invention further provides a share capturing mode in addition to the aforementioned picture capturing mode. The share capturing mode indicates a capturing mode capable of immediately sharing a captured picture via a sharing method (e.g., using a specific social network service (SNS)) corresponding to a prescribed fingerprint. This embodiment is described with reference to FIGS. 33a to 33c.

FIG. 33a to FIG. 33c are diagrams illustrating a method of entering a share capturing mode and capturing a picture in the share capturing mode according to one embodiment of the present invention. Referring to FIG. 33a (a), the controller 180 activates a camera 121 and displays a preview screen of the activated camera 121. If a prescribed fingerprint (a first fingerprint in an example shown in FIG. 33*a*) is recognized in this state, the controller 180 can enter a share capturing mode (refer to FIG. 33*a* (b)). In addition, when the controller enters the share capturing mode, the controller 180 can further display a first share indicator 3301 indicating a sharing method corresponding to the input prescribed fingerprint. The first share indicator 3301 indicates a method of sharing a captured picture using a "prescribed SNS (social network service)."

If a capturing command is received in the share capturing mode, the controller 180 captures a picture and can output a share pop-up window 3302. The share pop-up window 3302 is a pop-up window capable of writing a post corresponding to a sharing method that corresponds to the input prescribed fingerprint. The controller 180 can include the captured picture in the share pop-up window 3302 as an attached file. By doing so, a user can be provided with environment capable of sharing a picture by a picture capturing command only. When the post writing is completed, the controller 180 can control the post to be registered using the "prescribed SNS."

In the meantime, among the aforementioned embodiments, it is apparent that the embodiment described with reference to FIG. 27 can be applied by being independent from the embodiment described in FIG. 33*a*. Of course, the embodiment described with reference to FIG. 27 and the embodiment of FIG. 33*a* can be applied together. For instance, if a fingerprint for an index finger of a user is recognized, the controller can operate to enter the secured capturing mode. If a fingerprint for a middle finger of the user is recognized, the controller can operate to enter the share capturing mode.

Referring to FIG. 33*b* (a), the controller 180 activates a camera 121 and displays a preview screen of the activated camera 121. If a prescribed fingerprint (a second fingerprint in an example shown in FIG. 33*b*) is recognized in this state, the controller 180 can enter a share capturing mode (refer to FIG. 33*b* (b)). In addition, when the controller enters the share capturing mode, the controller 180 can further display a second share indicator 3304 indicating a sharing method corresponding to the input prescribed fingerprint. The second share indicator 3304 indicates a method of sharing a captured picture by directly transmitting a picture to a prescribed contact. The prescribed contact may correspond to a counterpart contact corresponding to the recognized second fingerprint.

In the share capturing mode shown in FIG. 33*b*, if a capturing command is received, the controller 180 captures a picture and can control the captured picture to be directly transmitted to the prescribed contact. By doing so, a user can be provided with environment capable of easily sharing a picture with a prescribed counterpart by a picture capturing command only. For instance, if a contact of a lover is registered with an index finger, a user may be able to easily transmit a captured picture to the lover of the user whenever the user takes a picture.

If a captured picture is transmitted to a prescribed counterpart, the controller 180 can further display a guide pop-up window 3305 indicating that the captured picture is transmitted to the prescribed counterpart. Meanwhile, if a plurality of fingerprints are recognized at the same time, the embodiments mentioned earlier in FIG. 33*a* and FIG. 33*b* can be applied all at once. This embodiment is described with reference to FIG. 33*c*.

Referring to FIG. 33*c* (a), the controller 180 activates a camera 121 and displays a preview screen of the activated camera 121. If a prescribed fingerprint (a first fingerprint in an example shown in FIG. 33*c*) is recognized in this state, the controller 180 can enter a share capturing mode (refer to FIG. 33*c* (b)) using a "prescribed SNS." In addition, the controller 180 can display a first share indicator 3301 corresponding to the share capturing mode using the "prescribed SNS" (refer to FIG. 33*c* (b)).

Subsequently, if a prescribed fingerprint (a second fingerprint in an example shown in FIG. 33*c*) is recognized, the controller 180 can enter not only the share capturing mode using the "prescribed SNS" but also a share capturing mode directly transmitting a captured picture to a prescribed contact (refer to FIG. 33 (*b*)). In particular, the embodiment of FIG. 33*a* and the embodiment of FIG. 33*b* can be simultaneously applied. By doing so, the controller 180 can display a second share indicator 3304 corresponding to the prescribed contact and the first share indicator 3301 together.

Figure 34:
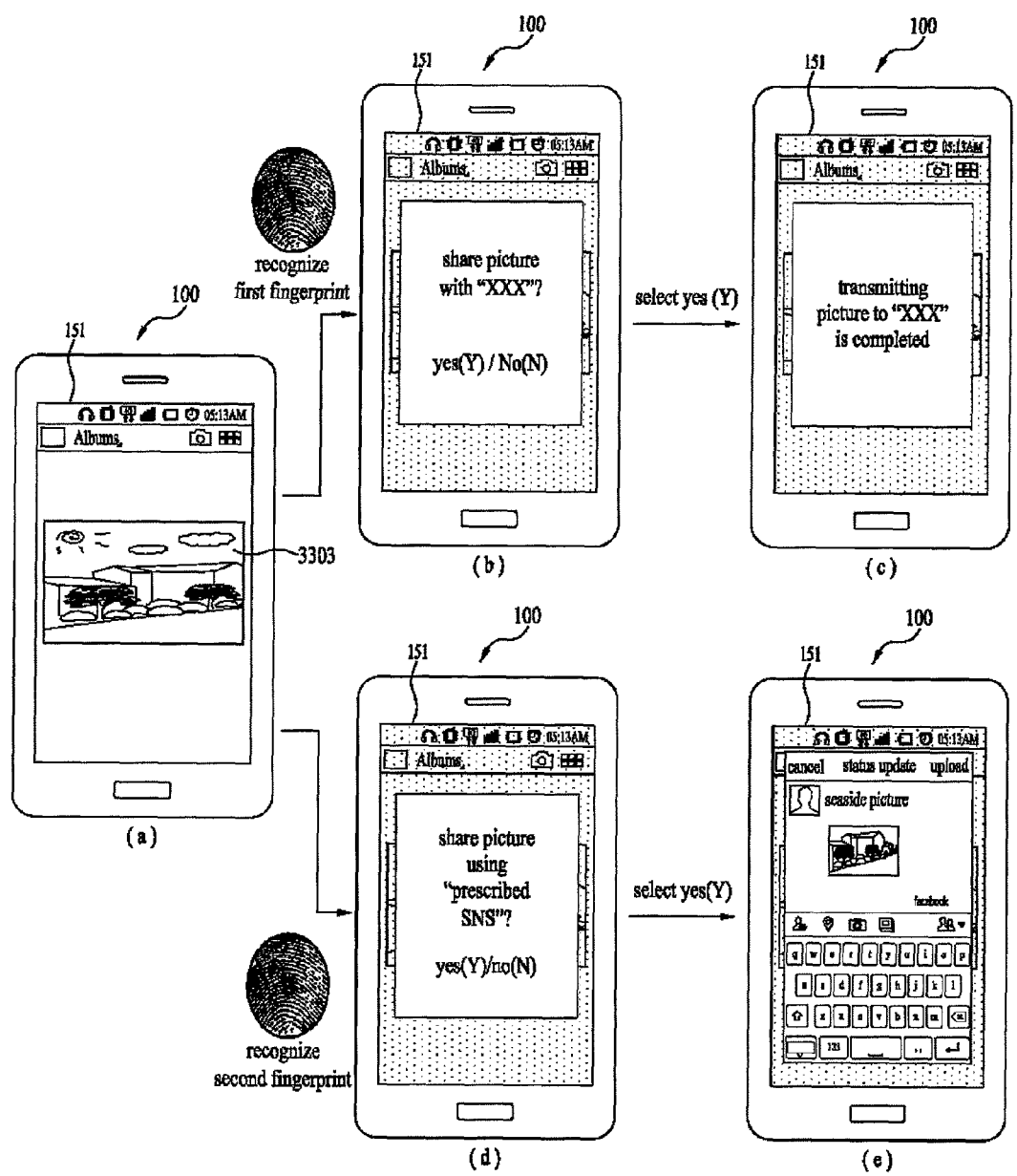
FIG. 34 is a diagram illustrating a method of distinguishing ways capable of sharing pre-stored image data from each other according to one embodiment of the present invention.

FIG. 34 is a diagram illustrating a method of distinguishing ways capable of sharing pre-stored image data from each other according to one embodiment of the present invention. Referring to FIG. 34 (*a*), the controller 180 is reading a prescribed image data via a gallery application. If a first fingerprint is recognized, the controller 180 can share the image data with a predetermined "prescribed counterpart" (refer to FIGS. 34 (*b*) and (*c*)). More specifically, if the first fingerprint is recognized, the controller 180 can output a pop-up window asking whether to share a picture with the "prescribed counterpart" (FIG. 34 (*b*)). If yes (Y) is selected from the pop-up window, the controller 180 can control the wireless communication unit 110 to transmit the image data used to be read by the controller to the prescribed counterpart.

If a second fingerprint is recognized, the controller 180 can write a post including the image data via a predetermined "prescribed application." More specifically, if the second fingerprint is recognized, the controller 180 can output a pop-up window asking whether to share the image data via the "prescribed application." If yes (Y) is selected from the pop-up window, the controller 180 includes the image data as an attached file 3303 and can display a pop-up window capable of writing a post, which can be shared with different users via the prescribed application.

According to at least one of embodiments of the present invention, if a prescribed fingerprint pattern is input via a fingerprint sensor, a user command corresponding to the prescribed fingerprint pattern can be easily executed. In addition, according to at least one of embodiments of the present invention, when storing a prescribed fingerprint pattern and a prescribed user command by matching with each other, user convenience can be enhanced.

Further, security can be easily set to a prescribed content provided via a mobile terminal and it is easy to read a content to which security is set. Further, it can easily set security to a picture data captured by a mobile terminal. And, according to at least one of embodiments of the present invention, in a screen on which a list of pictures captured by a mobile terminal is displayed, it can conveniently arrange the list using a prescribed condition. Also, according to at least one of embodiments of the present invention, it can easily share a picture captured by a mobile terminal with a different user.

The above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). In addition, the computer can include the control unit 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a wireless communication unit configured to provide wireless communication;
   a memory;
   a touch screen;
   a camera; and
   a controller configured to:
   store, in the memory, a first fingerprint from a first finger for triggering a first function of capturing an image with the camera,
   store, in the memory, a second fingerprint from a second finger different from the first finger for triggering a second function of filtering captured images according to a filtering condition and displaying filtered images from among the captured images according to the filtering condition,
   store, in the memory, a third fingerprint from a third finger different from the first and second fingers for triggering a third function of transmitting one of the filtered images,
   in response to receiving a first fingerprint input including the first fingerprint, execute the first function and capture the image with the camera,
   in response to receiving a second fingerprint input including the second fingerprint, execute the second function and filter the captured images according to the filtering condition and display the filtered images according to the filtering condition, and
   in response to receiving a third fingerprint input including the third fingerprint, transmit, via the wireless communication unit, the one of the filtered images.

2. The mobile terminal of claim 1, wherein the controller is further configured to:
   display a plurality of items on the touch screen,
   receive a touch selection of at least one of the plurality of items, and
   set a protected mode for the at least one of the plurality of items such that the at least one of the plurality of items is only displayed based on a fingerprint input including the first fingerprint.

3. The mobile terminal of claim 2, wherein the displayed plurality of items correspond to any one of a thumbnail image, an application icon, a folder and an event message.

4. A method of controlling a mobile terminal, the method comprising:
   storing, in a memory of the mobile terminal, a first fingerprint from a first finger for triggering a first function of capturing an image with a camera of the mobile terminal;
   storing, in the memory, a second fingerprint from a second finger different from the first finger for triggering a second function of filtering captured images according to a filtering condition and displaying filtered images from among the captured images according to the filtering condition;
   storing, in the memory, a third fingerprint from a third finger different from the first and second fingers for triggering a third function of transmitting one of the filtered images;
   in response to receiving a first fingerprint input including the first fingerprint, executing the first function and capturing the image with the camera;
   in response to receiving a second fingerprint input including the second fingerprint, executing the second function and filtering the captured images according to the filtering condition and displaying the filtered images according to the filtering condition; and
   in response to receiving a third fingerprint input including the third fingerprint, transmitting, via a wireless communication unit of the mobile terminal, the one of the filtered images.

5. The method of claim 4, further comprising:
   displaying on a touch screen of the mobile terminal a fingerprint registration interface for storing the first function corresponding to the first fingerprint.

* * * * *